(12) United States Patent
Mirzaei et al.

(10) Patent No.: US 11,613,016 B2
(45) Date of Patent: Mar. 28, 2023

(54) SYSTEMS, APPARATUSES, AND METHODS FOR RAPID MACHINE LEARNING FOR FLOOR SEGMENTATION FOR ROBOTIC DEVICES

(71) Applicant: BRAIN CORPORATION, San Diego, CA (US)

(72) Inventors: Ali Mirzaei, San Diego, CA (US); Oleg Sinyavskiy, San Diego, CA (US)

(73) Assignee: Brain Corporation, San Diego, CA (US)

( * ) Notice: Subject to any disclaimer, the term of this patent is extended or adjusted under 35 U.S.C. 154(b) by 394 days.

(21) Appl. No.: 16/527,292

(22) Filed: Jul. 31, 2019

(65) Prior Publication Data

US 2021/0031367 A1 Feb. 4, 2021

(51) Int. Cl.
| | | |
|---|---|---|
| G06F 19/00 | (2018.01) | |
| B25J 9/16 | (2006.01) | |
| G06N 3/08 | (2023.01) | |
| G06T 7/10 | (2017.01) | |
| G06T 7/90 | (2017.01) | |
| G06K 9/62 | (2022.01) | |
| G05D 1/02 | (2020.01) | |
| G06V 10/56 | (2022.01) | |
| G06V 20/10 | (2022.01) | |

(52) U.S. Cl.
CPC .......... *B25J 9/1666* (2013.01); *G05D 1/0221* (2013.01); *G06K 9/6263* (2013.01); *G06K 9/6267* (2013.01); *G06N 3/08* (2013.01); *G06T 7/10* (2017.01); *G06T 7/90* (2017.01); *G06V 10/56* (2022.01); *G06V 20/10* (2022.01); *G05D 1/0246* (2013.01); *G05D 2201/0203* (2013.01); *G05D 2201/0215* (2013.01); *G06K 9/6271* (2013.01)

(58) Field of Classification Search
CPC . B25J 9/1666; G06K 9/00664; G06K 9/6263; G06K 9/4652; G06K 9/6267; G06K 9/6271; G06N 3/08; G06T 7/10; G06T 7/90; G05D 1/0221; G05D 2201/0203; G05D 1/0246; G05D 2201/0215
See application file for complete search history.

(56) References Cited

U.S. PATENT DOCUMENTS 9,925,662 B1 * 3/2018 Jules .................... G05B 19/423
2005/0149228 A1 * 7/2005 Lee ...................... G05D 1/0242
318/568.12

(Continued)

*Primary Examiner* — Abby Y Lin
*Assistant Examiner* — Sohana Tanju Khayer
(74) *Attorney, Agent, or Firm* — Reed Smith LLP; Sidharth Kapoor

(57) ABSTRACT

Systems, apparatuses, and methods for rapid machine learning for floor segmentation for robotic devices are disclosed herein. According to at least one non-limiting exemplary embodiment, a robotic system is disclosed. The robotic system may comprise a neural network embodied therein capable of learning associations between color values of pixels and corresponding classifications of those pixels, wherein neural network is trained initially to identify floor and non-floor pixels within images. A user input may be provided to the neural network to further configure the neural network to be able to identify navigable floors and unnavigable floors unique to an environment without a need for additional annotated training images specific to the environment.

17 Claims, 10 Drawing Sheets

(56) References Cited

U.S. PATENT DOCUMENTS

| | | | |
|---|---|---|---|
| 2013/0245827 A1* | 9/2013 | Shetty | B25J 19/023 |
| | | | 700/259 |
| 2016/0100522 A1* | 4/2016 | Yamauchi | A01D 34/008 |
| | | | 701/25 |
| 2017/0020064 A1* | 1/2017 | Doughty | A01D 34/008 |
| 2018/0114064 A1* | 4/2018 | Schnittman | B25J 5/00 |
| 2019/0073259 A1* | 3/2019 | Qin | G06N 3/02 |
| 2019/0138826 A1* | 5/2019 | Ghafarianzadeh | G06N 3/0454 |
| 2020/0090316 A1* | 3/2020 | Man | G06T 3/40 |
| 2020/0125597 A1* | 4/2020 | Eoh | G06F 16/444 |
| 2020/0275604 A1* | 9/2020 | Chen | G05D 1/0219 |
| 2020/0348666 A1* | 11/2020 | Han | A47L 9/2889 |
| 2020/0372682 A1* | 11/2020 | Kim | G06N 3/08 |
| 2022/0024486 A1* | 1/2022 | Scott | G05D 1/0274 |

* cited by examiner

SYSTEMS, APPARATUSES, AND METHODS FOR RAPID MACHINE LEARNING FOR FLOOR SEGMENTATION FOR ROBOTIC DEVICES

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present application relates generally to robotics, and more specifically to systems, apparatuses, and methods for rapid machine learning for floor segmentation for robotic devices.

Background

Currently, robots may operate within a plurality of different environments by navigating along floors of these environments. These robots may be tasked with a specific task, such as cleaning, moving objects, moving people, and the like. These robots may be equipped with RGB cameras and computer vision systems to configure the robots to identify floor and navigate along the floor while avoiding non-floor objects, such as walls. These computer vision systems may comprise, in part, a neural network capable of learning associations between pixel color vales and classifications (e.g., floor or object) of those pixels, the learned associations may be taught using a large set of training images comprising annotation/label data. A single manufacturer producing many of these robots may struggle to teach each robot which floors are navigable and which are not within each environment of which the many robots operate as each robot may perform a different task which may configure each robot to operate on different floor types. For example, a mopping robot should not operate on carpet floors, but a vacuum robot should. As another example, a first robot made by a manufacturer may, based on a choice by a user of the robot, operate only on wood floors whereas a second robot of a same type (i.e., same model) made by the same manufacturer may not operate on wood floors in a same or different environment based on a choice by the same or different user.

Accordingly, these two robots may each require a unique set of annotated training images to learn associations between navigable floor and unnavigable floor, thereby requiring unique training sets of annotated/labeled images for the first and second robots. Generating unique sets of annotated training images for each robot may impose a heavy cost on the manufacturer to provide the unique sets of annotated training images for each robot in each environment Accordingly, there is a need in the art for improved systems and methods for rapid machine learning of floor segmentation by robotic devices such that a plurality of robotic devices may be trained to identify navigable floor pixels within color images for use in effectuating motion of the robots along the navigable floor and away from unnavigable floor and/or non-floor regions (e.g., regions comprising objects or empty spaces).

SUMMARY

The foregoing needs are satisfied by the present disclosure, which provides for, inter alia, systems, apparatuses, and methods for rapid machine learning for floor segmentation for robotic devices.

Exemplary embodiments described herein have innovative features, no single one of which is indispensable or solely responsible for their desirable attributes. Without limiting the scope of the claims, some of the advantageous features will now be summarized. One skilled in the art would appreciate that as used herein, the term robot may generally be referred to autonomous vehicle or object that travels a route, executes a task, or otherwise moves automatically upon executing or processing computer readable instructions. In some embodiments, the systems and methods disclosed herein may enable a manufacturer of a plurality of robots to utilize a single training set of images to train a plurality of robots to identify navigable floor, unnavigable floor, and non-floor regions which may be unique to each environment in which the plurality of robots operate.

According to at least one non-limiting exemplary embodiment, a robotic system is disclosed. The robotic system may comprise a non-transitory computer readable storage medium comprising a plurality of computer readable instructions embodied thereon and a processor configured to execute the instructions to: receive an image from a sensor; perform semantic segmentation on the image to determine floor and non-floor pixels of the color image, the semantic segmentation being performed by a neural network based on learned associations developed during a training process; receive a first user input comprising at least one of an indication of one or more pixels of the floor pixels corresponding to a navigable floor; and perform a second semantic segmentation on the image to determine navigable floor pixels and unnavigable floor pixels of the determined floor pixels based on the first user input. The processor may be further configured to execute the computer readable instructions to determine a set of weights for the neural network during the training process, the weights being determined based at least in part on pixel color values and associated labels of the pixels of an initial set of labeled training images, the classifications of the pixels of the initial set comprise at least floor and non-floor classes. In some embodiments, the processor may be further configured to execute the computer readable instructions to receive a second user input comprising an indication of at least one pixel of the floor pixels in the image corresponding to an unnavigable floor. The unnavigable floor pixels indicated by the second user input are classified with the classification of the non-floor pixels, and the navigable floor pixels indicated by the first user input are classified with the classification of the floor pixels. The processor may be further configured to execute the instructions to effectuate motion of the robotic system away from zones represented by the unnavigable floor pixels and along zones represented by the navigable floor pixels. The first user input comprises indication of at least one pixel on a user interface, the user interface displaying one of the color image, a predicted floor and non-floor segmentation of the color image, or a combination thereof. The specialized processor may be further configured to display on a user interface the second segmentation of the image based on the first user input; receive a third user input indicating at least one of an additional pixel of the image corresponding to navigable floor or an additional pixel of the image corresponding to unnavigable floor; and perform a third semantic segmentation to the image based on the third user input.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

Figure 1A:
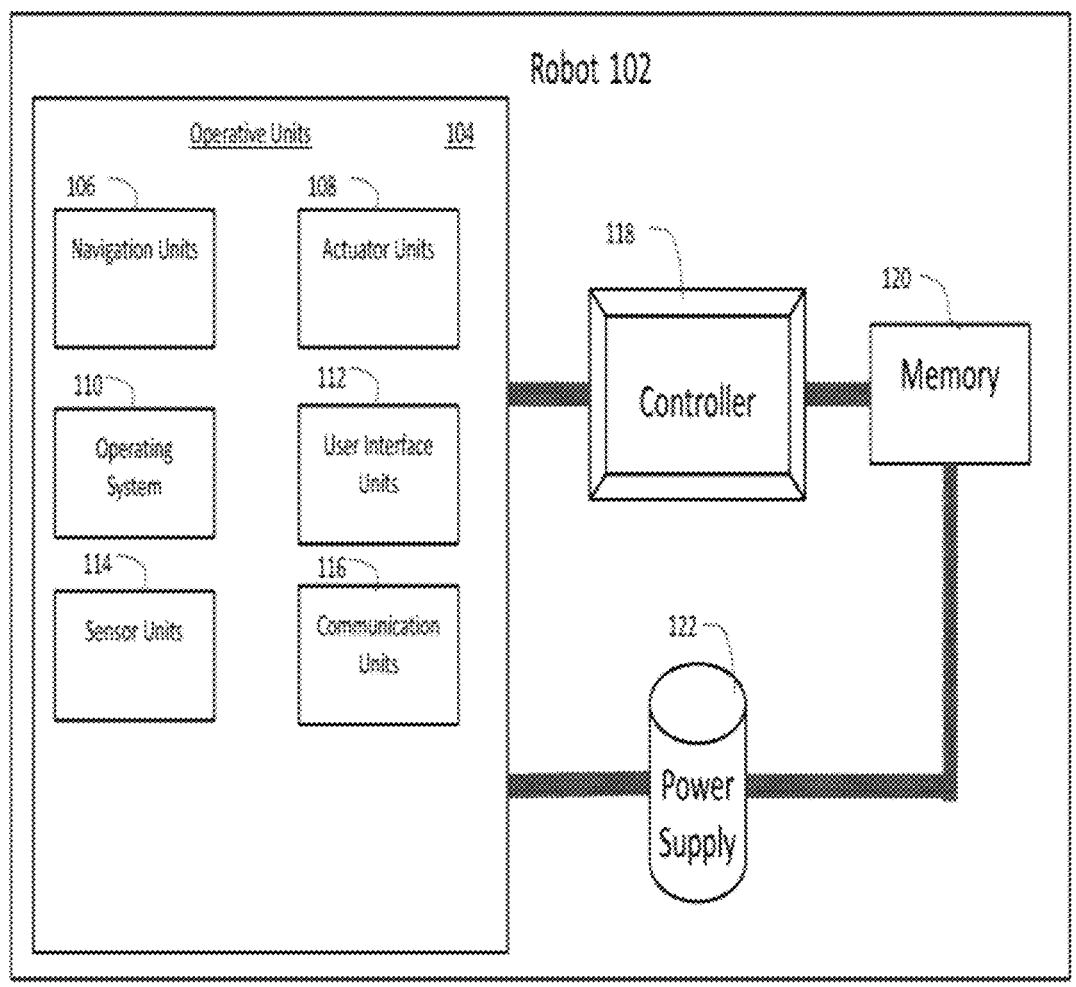
FIG. 1A is a functional block diagram of a main robot in accordance with some embodiments of this disclosure.

All Figures disclosed herein are © Copyright 2019 Brain Corporation. All rights reserved.

DETAILED DESCRIPTION

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art would appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein may be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for systems, apparatuses, and methods rapid learning of floor segmentation by robotic devices. As used herein, a robot or robotic device may include mechanical and/or virtual entities configured to carry out a series of tasks or actions autonomously. In some exemplary embodiments, robots may be machines that are guided and/or instructed by computer programs and/or electronic circuitry. In some exemplary embodiments, robots may include electro-mechanical components that are configured for navigation, where the robot may move from one location to another. Such robots may include autonomous and/or semi-autonomous cars, floor cleaners, rovers, drones, planes, boats, carts, trams, wheelchairs, industrial equipment, stocking machines, mobile platforms, personal transportation devices (e.g., hover boards, SEGWAYS®, etc.), stocking machines, trailer movers, vehicles, and the like. Robots may also include any autonomous and/or semi-autonomous machine for transporting items, people, animals, cargo, freight, objects, luggage, and/or anything desirable from one location to another.

As used herein, a process of semantic segmentation comprises parsing a color image and annotating or labeling each pixel, or region of pixels, with a specified annotation or label. This process of semantic segmentation may be utilized to determine regions within color images which correspond to certain objects, the objects being classified by their annotations (e.g., desk, chair, carpet floor, etc.). Semantic segmentation or segmentation of an image, as described herein, may be performed using one or more bounding boxes, pixel wise determination of annotations, or kernelized regions within the images corresponding to an annotation. Semantic segmentation may require training of a neural network to identify pixels corresponding to a specific label or annotation, as discussed below.

As used herein, an annotated or labeled image may comprise a plurality of pixels, each pixel comprising a classification (e.g., 'cat', 'car', 'human', etc.) associated thereto. Predicted segmentations, as used herein, comprise labeled images produced by a neural network, the labeled images comprise pixels encoded with a classification or label. Predicted segmentations may comprise some error as the predicted segmentations are based on a training process which may not be perfect or comprehensive in every instance, as opposed to annotated or labeled training images comprising ground truth annotation data for use in the training process.

As used herein, a classification or label of a pixel may comprise some classification, tag, identification, or other indication as to what object the pixel represents. For example, classifications or labels of a pixel may include a car, train, person, trashcan, floor, robot, printer, and any other object, feature, or thing detectable within an image.

As used herein, color values may refer to numeric values for encoding color within an image using any conventional method of encoding the color such as, for example, a set of red, green, and blue (RGB) color values, or variants thereof (e.g., red, blue, green (RBG), green red blue (GRB), etc.); greyscale values; brightness and/or luminance values; hue and saturation values (HSV); and the like. The values may comprise, for example, 8-bit, 16-bit, 32-bit, etc. numeric values. As used herein, an image or color image may comprise any image comprising pixels, the pixels being encoded with color values using any conventional method (e.g., RGB values, greyscale, luminance values, HSV, etc.).

As used herein, a no-go zone may correspond to any region within an image representing unnavigable terrain. No-go zones may correspond to pixels within the image representing non-floor regions, objects, people, or unnavigable floor space, wherein the unnavigable floor is programmed to a robot using the systems and methods disclosed herein. Use of the phrase 'no-go zone' to classify unnavigable regions for the robot 102, or any other phrase or word to represent a classification, is not intended to be limiting as other phrases for the classification are considered without limitation (e.g., 'unpassable region', 'unnavigable region', 'danger zone', and so forth).

As used herein, a manufacturer of a robot may comprise an original equipment manufacturer (OEM) of the robot and/or any human or computerized entity which, at least in part, configures, initializes, builds, trains, etc. the robot for use by a user. As used herein, a user may comprise an operator, user, or consumer/purchaser of the robot. In some instances, the user and manufacturer may comprise a same person or entity such as, for example, one skilled in the art in configuring, building, and utilizing a robot which, in part, uses the systems and methods disclosed herein. In some instances, the manufacturer and user may comprise separate entities comprising of, for example, a manufacturer who sells a robot to a separate user.

As used herein, network interfaces may include any signal, data, or software interface with a component, network, or process including, without limitation, those of the FireWire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, LTE/LTE-A/TD-LTE/TD-LTE, GSM, etc.), IrDA families, etc. As used herein, Wi-Fi may include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

As used herein, processor, microprocessor, and/or digital processor may include any type of digital processing device such as, without limitation, digital signal processors ("DSPs"), reduced instruction set computers ("RISC"), complex instruction set computers ("C SIC"), microprocessors, gate arrays (e.g., field programmable gate arrays ("FPGAs")), programmable logic device ("PLDs"), reconfigurable computer fabrics ("RCFs"), array processors, secure microprocessors, specialized processors (e.g., neuromorphic processors), and application-specific integrated circuits ("ASICs"). Such digital processors may be contained on a single unitary integrated circuit die or distributed across multiple components.

As used herein, computer program and/or software may include any sequence of machine cognizable steps which perform a function. Such computer program and/or software may be rendered in any programming language or environment including, for example, C/C++, C#, Fortran, COBOL, MATLAB™, PASCAL, GO, RUST, SCALA, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., "BREW"), and the like.

As used herein, connection, link, and/or wireless link may include a causal link between any two or more entities (whether physical or logical/virtual), which enables information exchange between the entities.

As used herein, computer and/or computing device may include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

Detailed descriptions of the various embodiments of the system and methods of the disclosure are now provided. While many examples discussed herein may refer to specific exemplary embodiments, it will be appreciated that the described systems and methods contained herein are applicable to any kind of robot. Myriad other embodiments or uses for the technology described herein would be readily envisaged by those having ordinary skill in the art, given the contents of the present disclosure.

Advantageously, the systems and methods of this disclosure at least: (i) reduce time spent annotating images by humans to train a neural network to learn an association between pixels and an annotation; (ii) enhance learning speed of neural networks by reducing a number of initial annotated images required to train the neural network to identify navigable floors for a robot; (iii) enhance navigation capabilities of robots within new environments by improving object detection and classification; and (iv) improve operation and safety of robots operating within new environments for a first time. Other advantages are readily discernable by one having ordinary skill in the art given the contents of the present disclosure.

FIG. 1A is a functional block diagram of a robot 102 in accordance with some principles of this disclosure. As illustrated in FIG. 1A, robot 102 may include controller 118, memory 120, user interface unit 112, sensor units 114, navigation units 106, actuator unit 108, and communications unit 116, as well as other components and subcomponents (e.g., some of which may not be illustrated). Although a specific embodiment is illustrated in FIG. 1A, it is appreciated that the architecture may be varied in certain embodiments as would be readily apparent to one of ordinary skill given the contents of the present disclosure. As used herein, robot 102 may be representative at least in part of any robot described in this disclosure.

Controller 118 may control the various operations performed by robot 102. Controller 118 may include and/or comprise one or more processors (e.g., microprocessors) and other peripherals. As previously mentioned and used herein, processor, microprocessor, and/or digital processor may include any type of digital processing device such as, without limitation, digital signal processors ("DSPs"), reduced instruction set computers ("RISC"), complex instruction set computers ("CISC"), microprocessors, gate arrays (e.g., field programmable gate arrays ("FPGAs")), programmable logic device ("PLDs"), reconfigurable computer fabrics ("RCFs"), array processors, secure microprocessors, specialized processors (e.g., neuromorphic processors), and application-specific integrated circuits ("ASICs"). Such digital processors may be contained on a single unitary integrated circuit die, or distributed across multiple components.

Controller 118 may be operatively and/or communicatively coupled to memory 120. Memory 120 may include any type of integrated circuit or other storage device configured to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RL-DRAM"), static RAM ("SRAM"), flash memory (e.g., NAND/NOR), memristor memory, pseudostatic RAM ("PSRAM"), etc.

Memory 120 may provide instructions and data to controller 118. For example, memory 120 may be a non-transitory, computer-readable storage apparatus and/or medium having a plurality of instructions stored thereon, the instructions being executable by a processing apparatus (e.g., controller 118) to operate robot 102. In some cases, the instructions may be configured to, when executed by the processing apparatus, cause the processing apparatus to perform the various methods, features, and/or functionality described in this disclosure. Accordingly, controller 118 may perform logical and/or arithmetic operations based on program instructions stored within memory 120. In some cases, the instructions and/or data of memory 120 may be stored in a combination of hardware, some located locally within robot 102, and some located remote from robot 102 (e.g., in a cloud, server, network, etc.).

It should be readily apparent to one of ordinary skill in the art that a processor may be external to robot 102 and be communicatively coupled to controller 118 of robot 102 utilizing communication units 116 wherein the external processor may receive data from robot 102, process the data, and transmit computer-readable instructions back to controller 118. In at least one non-limiting exemplary embodiment, the processor may be on a remote server (not shown).

In some exemplary embodiments, memory 120, shown in FIG. 1A, may store a library of sensor data. In some cases, the sensor data may be associated at least in part with objects and/or people. In exemplary embodiments, this library may include sensor data related to objects and/or people in different conditions, such as sensor data related to objects and/or people with different compositions (e.g., materials, reflective properties, molecular makeup, etc.), different lighting conditions, angles, sizes, distances, clarity (e.g., blurred, obstructed/occluded, partially off frame, etc.), colors, surroundings, and/or other conditions. The sensor data in the library may be taken by a sensor (e.g., a sensor of sensor units 114 or any other sensor) and/or generated automatically, such as with a computer program that is configured to generate/simulate (e.g., in a virtual world) library sensor data (e.g., which may generate/simulate these library data entirely digitally and/or beginning from actual sensor data) from different lighting conditions, angles, sizes, distances, clarity (e.g., blurred, obstructed/occluded, partially off frame, etc.), colors, surroundings, and/or other conditions. The number of images in the library may depend at least in part on one or more of the amount of available data, the variability of the surrounding environment in which robot 102 operates, the complexity of objects and/or people, the variability in appearance of objects, physical properties of robots, the characteristics of the sensors, and/or the amount of available storage space (e.g., in the library, memory 120, and/or local or remote storage). In exemplary embodiments, at least a portion of the library may be stored on a network (e.g., cloud, server, distributed network, etc.) and/or may not be stored completely within memory 120. As yet another exemplary embodiment, various robots (e.g., that are commonly associated, such as robots by a common manufacturer, user, network, etc.) may be networked so that data captured by individual robots are collectively shared with other robots. In such a fashion, these robots may be configured to learn and/or share sensor data in order to facilitate the ability to readily detect and/or identify errors and/or assist events.

Still referring to FIG. 1A, operative units 104 may be coupled to controller 118, or any other controller, to perform the various operations described in this disclosure. One, more, or none of the modules in operative units 104 may be included in some embodiments. Throughout this disclosure, reference may be to various controllers and/or processors. In some embodiments, a single controller (e.g., controller 118) may serve as the various controllers and/or processors described. In other embodiments different controllers and/or processors may be used, such as controllers and/or processors used particularly for one or more operative units 104. Controller 118 may send and/or receive signals, such as power signals, status signals, data signals, electrical signals, and/or any other desirable signals, including discrete and analog signals to operative units 104. Controller 118 may coordinate and/or manage operative units 104, and/or set timings (e.g., synchronously or asynchronously), turn off/on control power budgets, receive/send network instructions and/or updates, update firmware, send interrogatory signals, receive and/or send statuses, and/or perform any operations for running features of robot 102.

Returning to FIG. 1A, operative units 104 may include various units that perform functions for robot 102. For example, operative units 104 includes at least navigation units 106, actuator units 108, user interface units 112, sensor units 114, and communication units 116. Operative units 104 may also comprise other units that provide the various functionality of robot 102. In exemplary embodiments, operative units 104 may be instantiated in software, hardware, or both software and hardware. For example, in some cases, units of operative units 104 may comprise computer implemented instructions executed by a controller. In exemplary embodiments, units of operative unit 104 may comprise hardcoded logic. In exemplary embodiments, units of operative units 104 may comprise both computer-implemented instructions executed by a controller and hardcoded logic. Where operative units 104 are implemented in part in software, operative units 104 may include units/modules of code configured to provide one or more functionalities.

In exemplary embodiments, navigation units 106 may include systems and methods that may computationally construct and update a map of an environment, localize robot 102 (e.g., find the position) in a map, and navigate robot 102 to/from destinations. The mapping may be performed by imposing data obtained in part by sensor units 114 into a computer-readable map representative at least in part of the environment. In exemplary embodiments, a map of an environment may be uploaded to robot 102 through user interface units 112, uploaded wirelessly or through wired connection, or taught to robot 102 by a user.

In exemplary embodiments, navigation units 106 may include components and/or software configured to provide directional instructions for robot 102 to navigate. Navigation units 106 may process maps, routes, and localization information generated by mapping and localization units, data from sensor units 114, and/or other operative units 104.

Still referring to FIG. 1A, actuator units 108 may include actuators such as electric motors, gas motors, driven magnet systems, solenoid/ratchet systems, piezoelectric systems (e.g., inchworm motors), magneto strictive elements, gesticulation, and/or any way of driving an actuator known in the art. By way of illustration, such actuators may actuate the wheels for robot 102 to navigate a route; navigate around obstacles; rotate cameras and sensors.

Actuator unit 108 may include any system used for actuating, in some cases to perform tasks. For example, actuator unit 108 may include driven magnet systems, motors/engines (e.g., electric motors, combustion engines, steam engines, and/or any type of motor/engine known in the art), solenoid/ratchet system, piezoelectric system (e.g., an inchworm motor), magneto strictive elements, gesticulation, and/or any actuator known in the art. According to exemplary embodiments, actuator unit 108 may include systems that allow movement of robot 102, such as motorize propulsion. For example, motorized propulsion may move robot 102 in a forward or backward direction, and/or be used at least in part in turning robot 102 (e.g., left, right, and/or any other direction). By way of illustration, actuator unit 108 may control if robot 102 is moving or is stopped and/or allow robot 102 to navigate from one location to another location.

According to exemplary embodiments, sensor units 114 may comprise systems and/or methods that may detect characteristics within and/or around robot 102. Sensor units 114 may comprise a plurality and/or a combination of sensors. Sensor units 114 may include sensors that are internal to robot 102 or external, and/or have components that are partially internal and/or partially external. In some cases, sensor units 114 may include one or more exteroceptive sensors, such as sonars, light detection and ranging ("LiDAR") sensors, radars, lasers, cameras (including video cameras (e.g., red-blue-green ("RBG") cameras, infrared cameras, three-dimensional ("3D") cameras, thermal cameras, etc.), time of flight ("TOF") cameras, structured light cameras, antennas, motion detectors, microphones, and/or any other sensor known in the art. According to some exemplary embodiments, sensor units 114 may collect raw measurements (e.g., currents, voltages, resistances, gate logic, etc.) and/or transformed measurements (e.g., distances, angles, detected points in obstacles, etc.). In some cases, measurements may be aggregated and/or summarized. Sensor units 114 may generate data based at least in part on distance or height measurements. Such data may be stored in data structures, such as matrices, arrays, queues, lists, arrays, stacks, bags, etc.

According to exemplary embodiments, sensor units 114 may include sensors that may measure internal characteristics of robot 102. For example, sensor units 114 may measure temperature, power levels, statuses, and/or any characteristic of robot 102. In some cases, sensor units 114 may be configured to determine the odometry of robot 102. For example, sensor units 114 may include proprioceptive sensors, which may comprise sensors such as accelerometers, inertial measurement units ("IMU"), odometers, gyroscopes, speedometers, cameras (e.g. using visual odometry), clock/timer, and the like. Odometry may facilitate autonomous navigation and/or autonomous actions of robot 102. This odometry may include robot 102's position (e.g., where position may include robot's location, displacement and/or orientation, and may sometimes be interchangeable with the term pose as used herein) relative to the initial location. Such data may be stored in data structures, such as matrices, arrays, queues, lists, arrays, stacks, bags, etc. According to exemplary embodiments, the data structure of the sensor data may be called an image.

According to exemplary embodiments, user interface units 112 may be configured to enable a user to interact with robot 102. For example, user interface units 112 may include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory card ports (e.g., secure digital ("SD") and miniSD), and/or ports for computer-readable medium), mice, rollerballs, consoles, vibrators, audio transducers, and/or any interface for a user to input and/or receive data and/or commands, whether coupled wirelessly or through wires. Users may interact through voice commands or gestures. User interface units 218 may include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. According to exemplary embodiments user interface units 112 may be positioned on the body of robot 102. According to exemplary embodiments, user interface units 112 may be positioned away from the body of robot 102 but may be communicatively coupled to robot 102 (e.g., via communication units including transmitters, receivers, and/or transceivers) directly or indirectly (e.g., through a network, server, and/or a cloud). According to exemplary embodiments, user interface units 112 may include one or more projections of images on a surface (e.g., the floor) proximally located to the robot, e.g., to provide information to the occupant or to people around the robot. The information could be the direction of future movement of the robot, such as an indication of moving forward, left, right, back, at an angle, and/or any other direction. In some cases, such information may utilize arrows, colors, symbols, etc.

According to exemplary embodiments, communications unit 116 may include one or more receivers, transmitters, and/or transceivers. Communications unit 116 may be configured to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies such as 3G (3GPP/3GPP2), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

Communications unit 116 may also be configured to send/receive signals utilizing a transmission protocol over wired connections, such as any cable that has a signal line and ground. For example, such cables may include Ethernet cables, coaxial cables, Universal Serial Bus ("USB"), Fire-Wire, and/or any connection known in the art. Such protocols may be used by communications unit 116 to communicate to external systems, such as computers, smart phones, tablets, data capture systems, mobile telecommunications networks, clouds, servers, or the like. Communications unit 116 may be configured to send and receive signals comprising of numbers, letters, alphanumeric characters, and/or symbols. In some cases, signals may be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communications unit 116 may be configured to send and receive statuses, commands, and other data/information. For example, communications unit 116 may communicate with a user operator to allow the user to control robot 102. Communications unit 116 may communicate with a server/network (e.g., a network) in order to allow robot 102 to send data, statuses, commands, and other communications to the server. The server may also be communicatively coupled to computer(s) and/or device(s) that may be used to monitor and/or control robot 102 remotely. Communications unit 116 may also receive updates (e.g., firmware or data updates), data, statuses, commands, and other communications from a server for robot 102.

In exemplary embodiments, operating system 110 may be configured to manage memory 120, controller 118, power supply 122, modules in operative units 104, and/or any software, hardware, and/or features of robot 102. For example, and without limitation, operating system 110 may include device drivers to manage hardware recourses for robot 102.

In exemplary embodiments, power supply 122 may include one or more batteries, including, without limitation, lithium, lithium ion, nickel-cadmium, nickel-metal hydride, nickel-hydrogen, carbon-zinc, silver-oxide, zinc-carbon, zinc-air, mercury oxide, alkaline, or any other type of battery known in the art. Certain batteries may be rechargeable, such as wirelessly (e.g., by resonant circuit and/or a resonant tank circuit) and/or plugging into an external power source. Power supply 122 may also be any supplier of energy, including wall sockets and electronic devices that convert solar, wind, water, nuclear, hydrogen, gasoline, natural gas, fossil fuels, mechanical energy, steam, and/or any power source into electricity.

One or more of the units described with respect to FIG. 1A (including memory 120, controller 118, sensor units 114, user interface unit 112, actuator unit 108, communications unit 116, mapping and localization unit 126, and/or other units) may be integrated onto robot 102, such as in an integrated system. However, according to some exemplary embodiments, one or more of these units may be part of an attachable module. This module may be attached to an existing apparatus to automate so that it behaves as a robot. Accordingly, the features described in this disclosure with reference to robot 102 may be instantiated in a module that may be attached to an existing apparatus and/or integrated onto robot 102 in an integrated system. Moreover, in some cases, a person having ordinary skill in the art would appreciate from the contents of this disclosure that at least a portion of the features described in this disclosure may also be run remotely, such as in a cloud, network, and/or server.

As used here on out, a robot 102, a controller 118, or any other controller, processor, or robot performing a task illustrated in the figures below comprises a controller executing computer readable instructions stored on a non-transitory computer readable storage apparatus, such as memory 120, as would be appreciated by one skilled in the art.

Figure 1B:
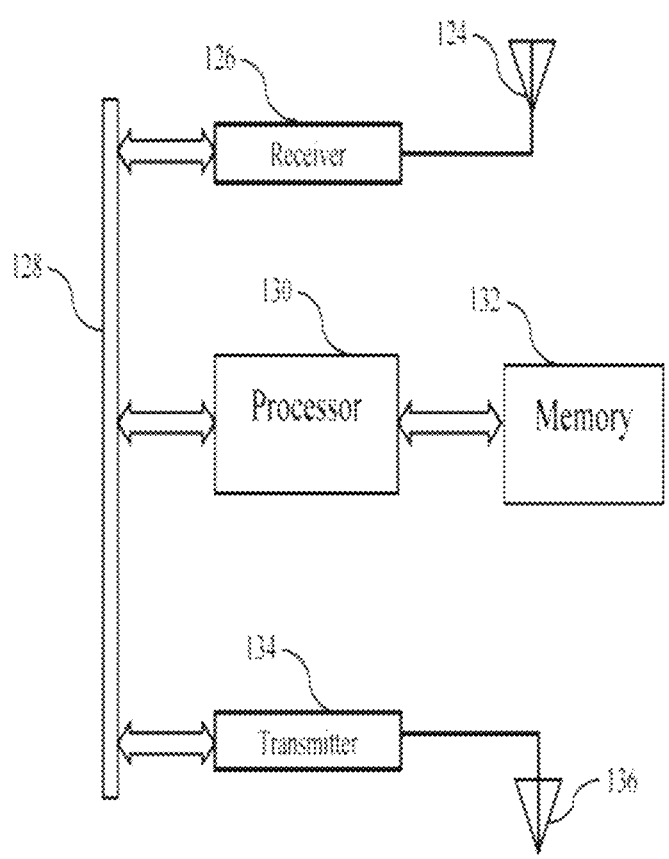
FIG. 1B is a functional block diagram of a controller or processor in accordance with some embodiments of this disclosure.

Next referring to FIG. 1B, the architecture of the specialized controller 118 used in the system shown in FIG. 1A is illustrated according to an exemplary embodiment. As illustrated in FIG. 1B, the specialized computer includes a data bus 128, a receiver 126, a transmitter 134, at least one processor 130, and a memory 132. The receiver 126, the processor 130 and the transmitter 134 all communicate with each other via the data bus 128. The processor 130 is a specialized processor configured to execute specialized algorithms. The processor 130 is configured to access the memory 132 which stores computer code or instructions in order for the processor 130 to execute the specialized algorithms. As illustrated in FIG. 1B, memory 132 may comprise some, none, different, or all of the features of memory 124 previously illustrated in FIG. 1A. The algorithms executed by the processor 130 are discussed in further detail below. The receiver 126 as shown in FIG. 1B is configured to receive input signals 124. The input signals 124 may comprise signals from a plurality of operative units 104 illustrated in FIG. 1A including, but not limited to, sensor data from sensor units 114, user inputs, motor feedback, external communication signals (e.g., from a remote server), and/or any other signal from an operative unit 104 requiring further processing by the specialized controller 118. The receiver 126 communicates these received signals to the processor 130 via the data bus 128. As one skilled in the art would appreciate, the data bus 128 is the means of communication between the different components—receiver, processor, and transmitter—in the specialized controller 118. The processor 130 executes the algorithms, as discussed below, by accessing specialized computer-readable instructions from the memory 132. Further detailed description as to the processor 130 executing the specialized algorithms in receiving, processing and transmitting of these signals is discussed above with respect to FIG. 1A. The memory 132 is a storage medium for storing computer code or instructions. The storage medium may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage medium may include volatile, nonvolatile, dynamic, static, read/write, read-only, random-access, sequential-access, location-addressable, file-addressable, and/or content-addressable devices. The processor 130 may communicate output signals to transmitter 134 via data bus 128 as illustrated. The transmitter 134 may be configured to further communicate the output signals to a plurality of operative units 104 illustrated by signal output 136.

One of ordinary skill in the art would appreciate that the architecture illustrated in FIG. 1B may illustrate an external server architecture configured to effectuate the control of a robotic apparatus from a remote location. That is, the server may also include a data bus, a receiver, a transmitter, a processor, and a memory that stores specialized computer readable instructions thereon.

Figure 2:
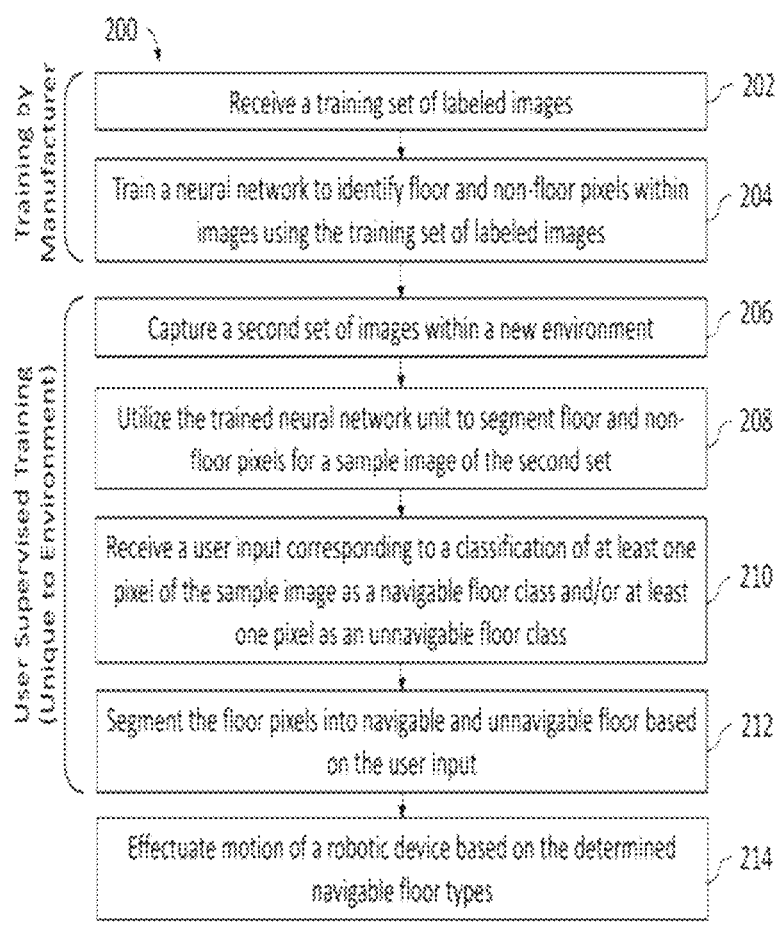
FIG. 2 is a process flow diagram illustrating a method for training a controller of a robot to segment floor and non-floor pixels within a color image and further segment the floor into navigable and unnavigable floor pixels based on a user input, according to an exemplary embodiment.

FIG. 2 is a process flow diagram illustrating a method 200 for a controller 118 of a robot 102 to train a neural network 500, further illustrated using an exemplary embodiment illustrated in FIG. 5 below, to identify navigable floor and non-navigable floor pixels within an image and accordingly effectuate motion of the robot 102 over the navigable floor, according to an exemplary embodiment. It is appreciated that any steps of method 200 performed by the controller 118 comprises of the controller 118 executing computer readable instructions from a memory 120. The neural network 500 may be embodied within hardware and/or computer readable instructions executed by the controller 118 or another processor 130 (e.g., a graphics processing unit (GPU)) of the robot 102, as appreciated by one skilled in the art.

Block 202 illustrates the controller 118 receiving a training set of labeled images. The training set of labeled images may comprise images with labels associated thereto, the labels corresponding to identified floor and non-floor pixels within the images. The training set of labeled images may include a plurality of labeled images. The training images may be captured within an environment of the robot 102 and/or separate environment. The training set of images may comprise, at least in part, images of floors, wherein pixels depicting the floors are labeled as 'floor', or similar classification, and the remaining pixels (e.g., representing objects or non-floor pixels) may be classified as 'no-go zone', 'default', 'background', or other similar classification, but not labeled as 'floor'. As used herein, a no-go zone corresponds to regions of which the robot 102 may not navigate including, for example, regions occupied by objects, unnavigable floors (as further discussed below), and/or pixels depicting non-floor regions (e.g., pixels above a horizon of an image representing empty space).

Figure 4:
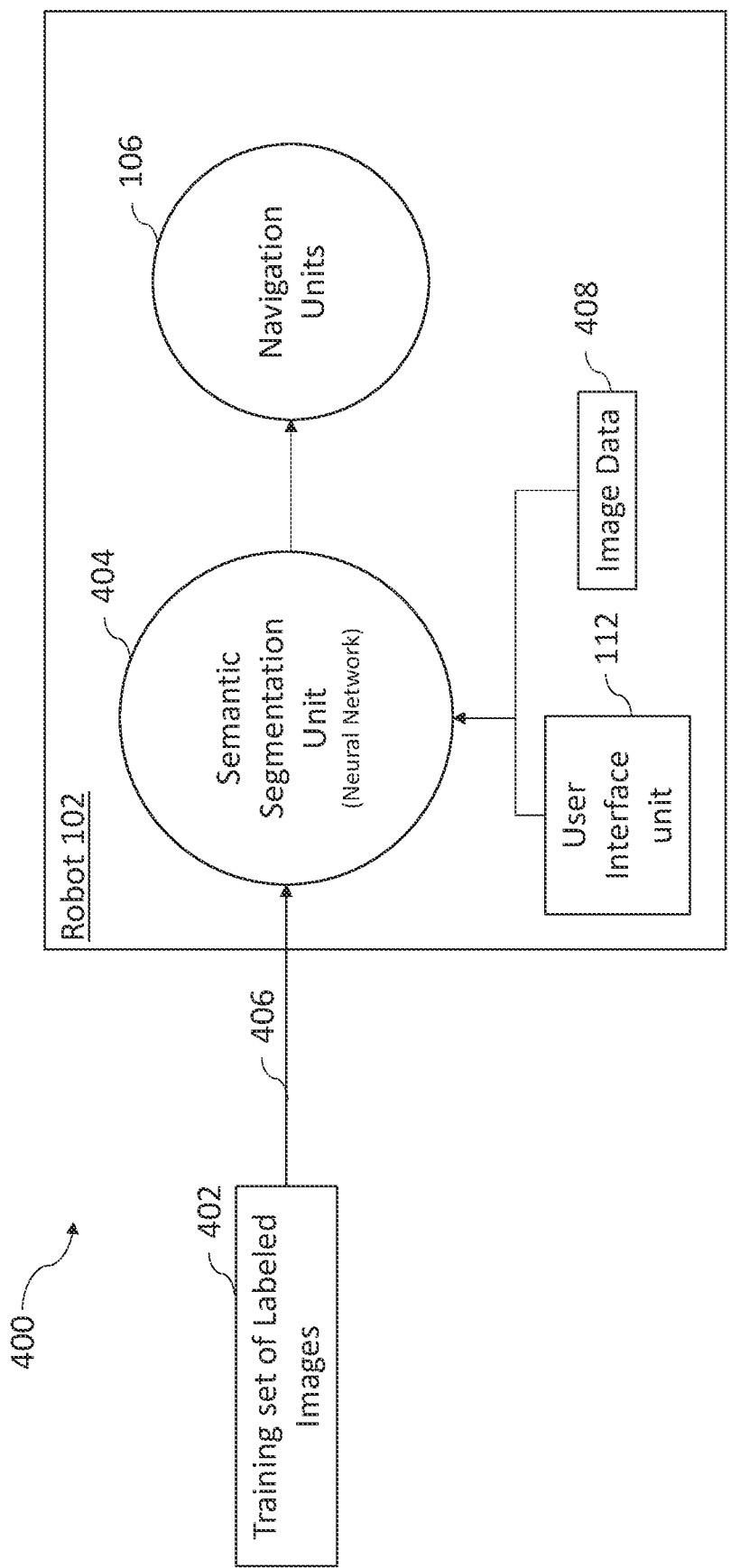
FIG. 4 is a functional block diagram of a system configured to train a semantic segmentation unit to identify navigable floors and no-go zones in an environment based on an initial set of annotated images and user input, according to an exemplary embodiment.

Block 204 illustrates the controller 118 training a neural network 500, described below in FIG. 5, to identify floor and non-floor pixels within images using the training set of labeled images. The training process of a neural network 500 is further described in FIG. 5 below. Briefly, the training process comprises providing the neural network 500 (i.e., semantic segmentation unit 404, as illustrated in FIG. 4 below) with color values (e.g., RGB, greyscale values, HSV, etc.) of pixels of the images of the training set to input nodes 502, providing corresponding labels of the training set of images for each pixel to respective output nodes 510, and configuring weights of intermediate nodes 506 such that the input color values yield the corresponding labels. This training process may be repeated for a plurality of images of the training set of labeled images such that optimal weights of the intermediate nodes 506 may be learned. The neural network 500 may comprise any neural network, neuromorphic hardware, or combination thereof such as, for example, image cascade networks ("IC-Net"), 'you only look once' ("YOLO") networks, convolutional neural networks, feed-forward neural networks, recurrent neural networks, neuromorphic processor hardware, long short term memories ("LSTM"), and the like.

The type/architecture of a neural network 500 may depend on processing resources available to the robot 102, among other factors appreciated by one skilled in the art. The neural network 500 may be illustrative of computer readable instructions executed by the controller 118 in accordance with the training process described in FIG. 5 below. It is appreciated that a performance threshold may be implemented to ensure the neural network 500 is sufficiently trained to identify floor and non-floor pixels within images using the training set of labeled images prior to moving to block 206. The performance threshold corresponding to a threshold accuracy (e.g., a number of correctly annotated/labeled pixels) of the neural network 500 to determine floor and non-floor pixels within images of the training set of images. This threshold may correspond to a model of the neural network 500 converging, as appreciated by one skilled in the art.

Blocks 202-204 may represent a training process for a manufacturer (e.g., an original equipment manufacturer (OEM)) of the robot 102, the training process comprising of training the neural network 500 to identify floor and non-floor pixels within images. As mentioned above, navigable floor types (e.g., wood, carpet, cement, tile, etc.) for robots 102 may vary from environment to environment. For example, a first cleaning robot 102 may clean (i.e., navigate upon) wood floors while a second cleaning robot 102 may be required to avoid wood floors based on decisions made by users (i.e., purchasers) of the robots 102, wherein both robots 102 may be trained to identify floor and non-floor pixels using the same training set of labeled images. The remaining blocks 206-214 illustrate a novel method a user of a robot 102 to teach a neural network 500 which portions of the floor, of the identified floor pixels, are navigable and which portions are unnavigable, wherein the navigable floors and unnavigable floors may be different for each environment of each robot 102 made by the manufacturer based on a choice of a user of each robot 102.

Block 206 illustrates the controller 118 capturing a second set of images within a new environment while under supervised training of a user. The second set of images may comprise, at least in part, a navigable floor as well as other objects and/or unnavigable floor types. The controller 118 may capture the second set of images using sensor units 114. The controller 118 may activate an actuator unit(s) 108 to navigate to the new environment or may be positioned in the new environment by a user of the robot 102 to capture the second set of images.

Block 208 illustrates the controller 118 utilizing the neural network 500 to segment floor and non-floor pixels for a sample image of the second set of images, the sample image being one of the one or more images of the second set of images. The segmentation of the floor and non-floor pixels within the sample image being based on the training process described in blocks 202-204 and in FIG. 5 below. For example, the neural network 500 may classify one region of pixels as 'floor' and the rest as 'non-floor' or 'no-go zone' for the robot 102, wherein a no-go zone may comprise any region of unnavigable space for the robot 102 (e.g., no-go zones may comprise pixels corresponding to objects, cliffs/ledges, non-floor, etc.), as illustrated by image 318 of FIG. 3B(ii) below. It is appreciated that the neural network 500 is sufficiently trained, using the training set of labeled images and methods illustrated in blocks 202-204, to at least identify floor and non-floor pixels within images.

Block 210 illustrates the controller 118 receiving a user input corresponding to a classification of at least one pixel of the sample image of the second set of images as a 'navigable floor' type and/or at least one pixel being an 'unnavigable floor' type. The controller 118 may, for example, display the sample image of the second set to a user interface unit 112 (e.g., a touch screen monitor) and prompt an operator of the robot 102 to indicate (e.g., by tapping the monitor) one or more pixels corresponding to the navigable floor and one or more pixels corresponding to the unnavigable floor. Color values of the indicated pixels, and in some embodiments neighboring pixels, may be sampled by the controller 118 and utilized by the neural network 500 to develop further associations between the color values of the indicated navigable floor and unnavigable floor pixels with their associated 'navigable floor' or 'unnavigable floor' classification, respectively. The 'unnavigable floor' classification may be considered by the controller 118 to be the same classification as the 'no-go zone' classification (i.e., the same classification as non-floor pixels comprising objects, non-floor pixels, etc.) thereby reducing the semantic segmentation performed by the neural network 500 to a two class classification. The two classes being navigable floor or 'go-zone' (i.e., remaining 'floor' pixels after unnavigable floor pixels are associated with 'no-go zone' classification) and 'no-go zone', or similar variants thereof (e.g., 'impassable floor' and 'unnavigable region', etc.) without limitation.

According to at least one non-limiting exemplary embodiment, the sample image of the second set of images may only comprise pixels representative of navigable floor. Accordingly, the user input may comprise of the user indicating only navigable floor pixels. Similarly, in some instances, the sample image may only comprise pixels representative of a no-go zone (i.e., unnavigable floor and/or non-floor pixels), wherein the user input may only comprise indication of pixels corresponding to the unnavigable floor. That is, indicating both navigable and unnavigable floor on the sample image is not intended to be limiting as both navigable and unnavigable floors may not always be represented in the sample image. For example, a sample image may comprise an image of only carpet floor and some objects, and robot 102 may comprise a robot configured to mop floors, wherein carpet floors may be considered unnavigable. Accordingly, the user input may only comprise of an indication of one or more unnavigable floor pixels within the sample image as no navigable floor pixels are present. In another example, a sample image may only comprise navigable floors and non-floor pixels (e.g., objects, empty space, etc.), the non-floor pixels being identified by the neural network 500 based on training in blocks 202-204. Accordingly, the user input may only comprise of an indication of one or more navigable floor pixels as no unnavigable floor pixels are present within the sample image in this example.

Block 212 illustrates the controller 118 utilizing the neural network 500 to segment the determined floor pixels of the sample image, determined in block 208, into navigable or unnavigable floor pixels based on the user input. The controller 118 may utilize, for example, a clustering analysis to determine floor pixels similar to the indicated 'unnavigable floor' and 'navigable floor' pixels based on the user input received in block 210. Floor pixels indicated by the user, as well as similar pixels based on the cluster analysis, comprising navigable floor may still be classified as 'floor' pixels. The floor pixels indicated by the user input, as well as similar pixels based on the cluster analysis, comprising unnavigable floor, may be associated with the 'no-go zone' classification. That is unnavigable floor equates to or is classified as 'no-go zone' which comprises the same classification as pixels of objects, empty space, or other non-floor pixels. Similarly, the 'navigable floor' pixels indicated by the user input are classified as 'floor' which comprises the same classification of floor pixels determined in block 208. Advantageously, the aforementioned classification of 'navigable floor' as the 'floor' class and 'unnavigable floor' as part of the 'no-go zone' class reduces the number of classifications the neural network 500 is to be trained to identify to two classes. Training of the neural network 500 to perform a two class classification uses substantially fewer training inputs (e.g., fewer user inputs, fewer labeled training images, etc.) and less computing resources of controller 118 as opposed to a three, or more, class classification.

It is appreciated by one skilled in the art that the steps outlined in blocks 208-212 may be performed on any number of sample images of the second set of images. That is, the steps in blocks 208-212 may be repeated any number of times until an operator of the robot 102 determines the navigable floor and non-navigable floor segmentation is sufficiently accurate. Additionally, the operator may repeat the steps in blocks 208-212 to teach the robot 102 (i.e., train neural network 500) to classify all floor types (e.g., wood, carpet, tile floors of various colors, etc.) within the environment of the robot 102 as navigable or unnavigable. This may be useful for classifying multiple floors as navigable and/or unnavigable floors within an environment if all of the floors cannot be captured within a single sample image.

According to at least one non-limiting exemplary embodiment, a robot 102, comprising a neural network 500 trained to identify floor and non-floor pixels, may be driven or pushed around an environment (e.g., in a manual operative mode) and capture a set of images as part of an initialization procedure. The controller 118 may determine which regions comprise navigable floor based on which floors the robot 102 was driven or pushed over, wherein the controller 118 may utilize color images of floors navigated upon by the robot 102 to identify 'navigable floor' and 'unnavigable floor' pixels within the captured images. That is, the user input may be received via the user effectuating motion of the robot 102, and is not intended to be limited to indications of pixels from a user interface unit 112.

Block 214 illustrates the controller 118 effectuating motion of the robot 102 based on the determined navigable floor types. The motion of the robot 102 may be configured to, for example, avoid no-go zones (i.e., unnavigable floor and non-floor regions, such as regions comprising objects) and navigate on navigable floor space. That is, the controller 118 may, based on the training of the neural network 500 (blocks 202-204) and user input (block 212), determine a route for the robot 102 to follow in accordance with avoiding the no-go zones and unnavigable floor while navigating over the navigable floor types only. Further, the controller 118 may utilize the trained neural network 500, now further trained to identify navigable floors and no-go zones, to determine navigable floors and unnavigable floors within images taken during operation of the robot 102 at later times during operation of the robot 102. The controller 118 may activate one or more actuator units 108 to effectuate the motion of the robot 102.

Advantageously, use of a user input to determine if a floor type comprises a no-go zone or navigable floor space may further enhance the training of a plurality of neural networks 500 of a plurality of robots 102, each robot 102 operating within different environments, as the user input enables the user to decide which floors are navigable or unnavigable. Using method 200, a manufacturer of the plurality of robots 102 may only be required to provide a training set of images to train the neural networks 500 of the robots 102 to identify floor and non-floor pixels within images, wherein the images provided to each robot 102 by the manufacturer may be substantially similar or the same set of images, thereby reducing a total number of labeled images of the training set required to train all of the robots 102 to identify floor and non-floor (i.e., no-go zones) pixels. Additionally, the user input may further configure each robot 102 to identify different floors as navigable and unnavigable within each environment of each of the plurality of robots 102 based on the user input, wherein the user input may be unique for each environment in which the robots operate. For example, a first robot 102 may receive a user input indicating to not navigate on wood floors (i.e., classifying a pixel of wood floors of a sample image as 'no-go zone'), whereas a second robot 102, operating in a separate environment or with a different configuration (i.e., a different robot 102), may receive a different input from the same or different user to navigate only on wood floors (i.e., the user input comprises classifying wood floor pixels of a sample image as 'navigable'). Both robots 102 in this example may be trained using the same training set of images by a manufacturer such that both robots 102 may segment floor and non-floor pixels.

Stated differently, a manufacturer may only be required to train neural networks 500 of robots 102 made by the manufacturer to identify floor and non-floor pixels in images, wherein further segmentation of 'navigable floor' and 'unnavigable floor' (i.e., 'no-go zone') is effectuated by the user input, thereby enabling the user (i.e., purchaser of robot(s) 102) to decide which floors are navigable or unnavigable unique to an environment and/or function of the robot 102 in which the user wishes to use and deploy the robot 102. Further, training by the manufacturer may only require a single set of training images, comprising 'floor' and 'no-go zone' (i.e., 'not floor', 'impassable terrain', or other similar classification), thereby reducing time and labor costs to train each neural network 500 of each robot 102 made by the manufacturer.

It is appreciated that the 'navigable floor' classification, as used herein, may comprise a same classification as 'floor' such that only two classifications are considered by the neural network 500, the two classifications being 'floor' and 'no-go zone', wherein the user input configures the neural network 500 to associate the 'navigable floor' with the 'floor' classification and associate 'unnavigable floor' and 'non-floor' (i.e., objects, empty space, etc.) with the 'no-go zone' classification.

Figure 3A:
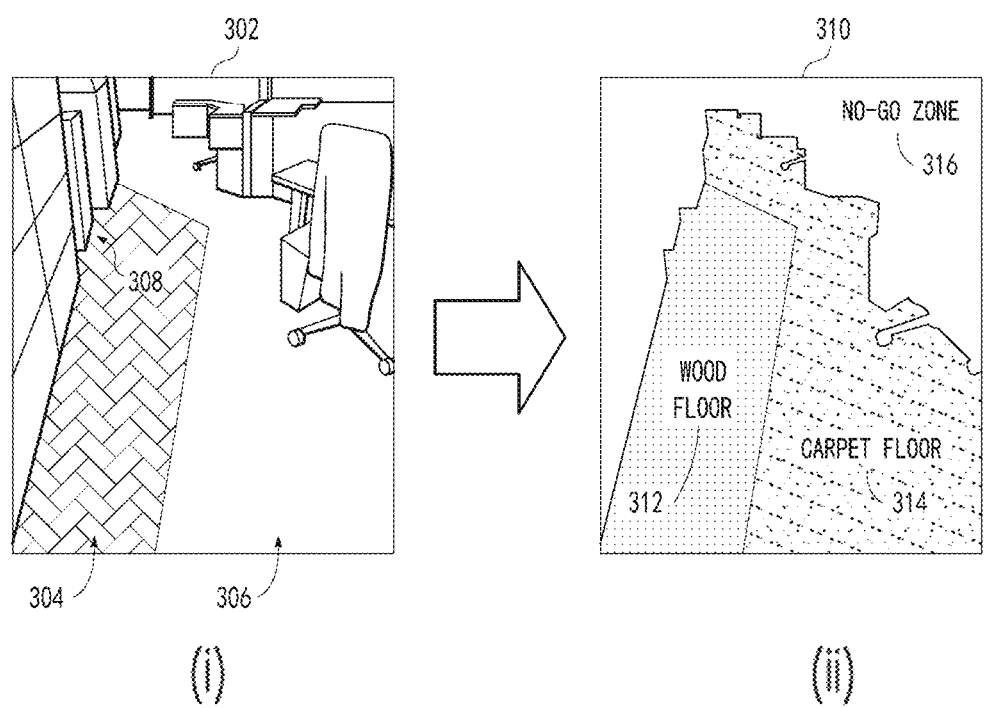
FIG. 3A (i)-(ii) illustrates an unannotated color image and a corresponding annotations or labels associated thereto, in accordance with some embodiments of the present disclosure.

FIG. 3A(i)-(ii) illustrates an annotation or labeling of an image 302 to generate an annotated or labeled image 310, in accordance with some exemplary embodiments of this disclosure. The labeled image 310 generated may comprise at least two classifications of at least two respective objects represented by regions of pixels within the image 302, wherein the classifications are performed by, for example, a human and are considered as ground truths. The image 302, depicted in FIG. 3A(i), may comprise an RGB color image, HSV image, or greyscale image of an office space comprising a wood floor 304, a carpet floor 306, and obstacles 308 including printers, desks, chairs, walls, windows, and other objects of which a robot 102 may avoid or cannot navigate over during autonomous navigation.

Figure 3B:
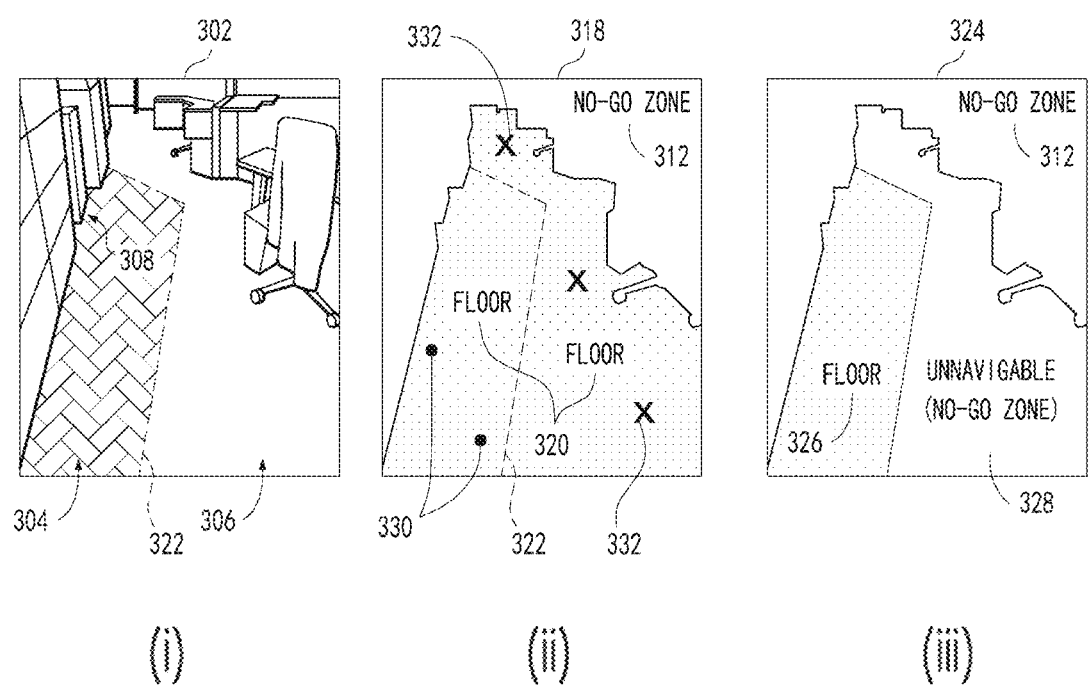
FIG. 3B (i)-(iii) illustrates a semantic segmentation unit generating a floor and non-floor segmentation and receiving a user input to further segment the floor into navigable and unnavigable floor regions, according to an exemplary embodiment.

As depicted in FIG. 3B(ii), the labeled image 310 may be generated by assigning each pixel of the image 302 with an associated annotation, label, or classification. The classifications in this example include wood floor 312, carpet floor 314, and no-go zone 316 corresponding to pixels of the image 302 depicting the wood floor 304, carpet floor 306, and obstacles 308, respectively. One skilled in the art may appreciate that a labeled image 310 of an image 302 may comprise a plurality of additional classifications for a plurality of different objects within the image 302 (e.g., 'printer', 'chair', etc.), wherein only three classifications 312, 314, and 316 have been illustrated for clarity. It is further appreciated that labeled image 310 may be illustrative of annotation data of the image 302, wherein image 310 may not exist as a visual image in every embodiment (e.g., image 310 may be illustrative of encoded classification data for pixels of the image 302). The labeled image 310 may comprise ground truth annotations (i.e., no incorrectly annotated pixels) generated by, for example, a human annotating the image manually.

According to at least one non-limiting exemplary embodiment, the regions 312, 314, and 316 may be represented by one or more bounding boxes, comprising a square region of pixels, or other shape, encompassing an annotated object. According to another non-limiting exemplary embodiment, the regions 312, 314, and 316 may be represented by a kernelized function which defines a continuous boundary of each region. That is, any method for indicating a region or group of pixels comprises a corresponding classification is considered without limitation.

FIG. 3B(i)-(iii) illustrates an exemplary predicted segmentation 318 of an image 302 performed by a neural network 500, illustrated in FIG. 5 below, according to an exemplary embodiment. Following methods illustrated by blocks 202-204 of method 200 described above, the neural network 500 may use a training set of labeled images to learn associations between labels of pixels and color values of those pixels, wherein the labels comprise at least 'floor' and 'no-go zone' (or 'non-floor') classes. The associations may configure the neural network 500 to segment floor and non-floor pixels within the image 302 of FIG. 3B(i). Accordingly, the neural network 500 may produce a predicted segmentation 318, depicted in FIG. 3B(ii), of the image 302 comprising pixels being annotated as either no-go zone 312 (i.e., not floor pixels, illustrated in white) or as floor pixels 320 (illustrated in grey). A dashed line 322 is illustrated representing a transition from wood floor 304 to carpet floor 306 for reference to image 302 of FIG. 3B(i), wherein it is appreciated that the dashed line 322 may not be identified during semantic segmentation of image 302 into 'floor' and 'non-floor' pixels.

A user may be prompted, via a display on a user interface unit 112, to indicate at least one pixel of the image 302 corresponding to navigable floor and/or unnavigable floor. The display may comprise, for example, a user interface displaying the image 302, displaying the predicted segmentation 318, or displaying the predicted segmentation 318 overlaid on the image 302, wherein the indication may be received by the user clicking, tapping, or otherwise specifying certain pixels as being navigable or unnavigable floor. Accordingly, the user inputs 330 (circles) may correspond to indications of pixels of a navigable floor 304 and user inputs 332 (crosses) may correspond to indications of unnavigable floor. The user inputs 330, 332 are analogous to the user providing annotations or labels to the image 302 for further training of the neural network 500, similar to the use of the training set of labeled images to train the floor and non-floor segmentation. As illustrated in FIG. 3B(ii)-(iii), the neural network 500 may utilize pixels indicated by user input(s) 330 to determine region 326 (grey) comprises the 'floor' classification, corresponding to the portion of the floor being navigable. That is, pixels within portion 326 do not change their classification of 'floor' after receipt of the user inputs 330, 332. Similarly, the neural network 500 may utilize pixels indicated by user input(s) 332 to determine region 328 corresponds to the 'no-go zone' classification, as illustrated by the region 328 being illustrated in white (i.e., the same classification as the non-floor pixels of region 312 associated with the no-go zone classification).

To determine from the user inputs 330, 332, depicted in FIG. 3B(ii), which pixels comprise navigable and unnavigable floor pixels, color values (e.g., RGB values, greyscale and luminance, HSV, etc.) may be sampled from the pixels indicated via the user inputs 330, 332. The color values of these sampled pixels may be utilized in, for example, a cluster analysis to determine other pixels of similar color values within the image 302. These similar pixels may be grouped together and associated with 'floor' and 'no-go zone' classifications, respectively. For example, with reference to FIG. 3B(i)-(ii), the neural network 500 may determine all pixels of floor 304 to the left of line 322 of image 302 (i.e., excluding objects 308 identified as no-go zone 312) are substantially similar to each other and may group them together in a first group. Similarly, pixels of floor 306 to the right of line 322 of image 302 (i.e., excluding objects 308 identified as no-go zone 312, such as the chair, tables, etc.) may be determined to be substantially similar to each other and be grouped together in a second group. The neural network 500 may determine color values of pixels indicated by user inputs 330, indicating navigable floor, are substantially similar to the first group and color values of pixels indicated by user inputs 332, indicating unnavigable floor, are substantially similar to the second group. Accordingly, the neural network 500 may associate the first group with the 'floor' classification to and the second group with the 'no-go zone' classification.

According to at least one non-limiting exemplary embodiment, an image 302 may comprise no pixels representing navigable floor, wherein the image 302 may only comprise regions of non-floor pixels and/or unnavigable floor pixels. Accordingly, a user may only be required to provide user inputs 332, indicating one or more pixels corresponding to unnavigable floor, such that the neural network 500 may utilize color values of the one or more pixels of unnavigable floor as additional training samples to further enhance the training of the neural network 500 to identify unnavigable floor and classify the unnavigable floor as a 'no-go zone'. Similarly, an image 302 may comprise no pixels representing unnavigable floor, wherein only the user inputs 330 may be required for a substantially similar purpose. That is, inputting both user inputs 330 and 332 is not intended to be limiting as, in some instances, an image 302 may not comprise both unnavigable and navigable floors represented therein.

Advantageously, a manufacturer of the robots 102 may train all manufactured robots 102 using a same training image set such that all of the robots 102 may segment floor and non-floor pixels within images for further use in determining navigable and unnavigable floors. The user inputs 330 and 332 further enhance the training of the neural network 500 by indicating navigable or unnavigable floors unique to an environment. For example, a first robot 102 may operate within a first environment, wherein a first operator may provide a user input 330 to indicate to the first robot 102 that wood floors 304 are navigable. A second robot 102, of a same or different configuration as the first robot 102, may operate within a separate environment, wherein a second operator of the second robot 102 may determine that the second robot 102 should operate on carpet floors 306 and avoid wood floors 304 using user inputs 330 and 332, respectively. In this example, both the first and second robots 102 may be trained using a single training image set of labeled images to identify floor and non-floor pixels (e.g., by a manufacturer of both robots 102), wherein further segmentation of the floor pixels into navigable and unnavigable floor is effectuated by a supervised training process based on the user inputs 330, 332 from the first and second operators. Thereby, reducing a total number of annotated images required to train the neural network 500 to identify navigable and unnavigable floors as the user inputs 330 and 332 further configures (i.e., trains) the neural network 500 to be able to identify navigable and unnavigable floor space within images, respectively.

FIG. 4 is a functional block diagram of a system 400 configured to train a robot 102, comprising a semantic segmentation unit 404, to detect navigable and unnavigable floors within image data 408 from an camera of sensor units 114 using a training set of labeled images 402, according to an exemplary embodiment. The training set of labeled images 402 may comprise an initial training set of labeled images, each image comprising annotated (i.e., encoded) pixels corresponding to a classification of the pixel being an object of a certain type (e.g., floor or not floor), for example as illustrated in FIG. 3B(i)-(ii). The labeled images may comprise ground truth classifications of pixels (i.e., substantially accurate or perfectly correct). It is appreciated that any communications between two operative units depicted may comprise a wired and/or wireless communication link.

The semantic segmentation unit 404 may comprise a neural network 500, illustrated below in FIG. 5, capable of learning associations between color values of pixels of the training set of images 402 their corresponding labels. The training set of labeled images 402 trains the semantic segmentation unit 404 to identify 'floor' and 'non-floor' pixels by providing exemplary label data (i.e., samples of 'floor' and 'non-floor' pixels). The 'non-floor' pixels may be referred to herein as 'no-go zones'. The training set of labeled images comprises, at least, two classifications for pixels of the image, the two classifications being 'floor' and 'non-floor' (i.e., no-go zone). The neural network 500 of the semantic segmentation unit 404 may be implemented in hardware (e.g., neuromorphic processors), software (e.g., computer code executed by a GPU), or a combination thereof. Semantic segmentation unit 404 may similarly be illustrative of computer readable instructions executed by a controller 118 of the robot 102 and is not intended to be limited to a separate operative unit of the robot 102.

The robot 102 may navigate to a new environment at a later time and, upon having completed a training of the semantic segmentation unit 404 to identify floor and non-floor pixels within images (e.g., blocks 202-204 of method 200 of FIG. 2 above), receive image data 408 comprising images captured by a camera of sensor units 114 (i.e., the second set of images of block 206 of FIG. 2 above). The robot 102 may sample an image from camera data 408 and utilize the semantic segmentation unit 404 to segment the sampled image into 'floor' and 'no-go zone' (i.e., 'non-floor') pixels based on training using the training set of labeled images 402. The sampled image, the segmented version of the segmented image, or a combination thereof may then be displayed to a user of the robot 102 via user interface unit(s) 112. The user of the robot 102 may provide at least one input 330 and/or at least one input 332 to the user interface unit(s) 112 to indicate pixels of floor types are which are navigable or unnavigable, respectively. The semantic segmentation unit 404 may utilize, for example, cluster analysis on color values of pixels of the sampled image to determine pixels similar to the ones indicated by the user input 330, 332 to determine which pixels of the image comprise navigable and unnavigable floor pixels based on their similarity to the pixels indicated by the user. The unnavigable floor pixels may be considered as a 'no-go zone' along with to the non-floor pixels and the indicated navigable floor pixels may be associated with the 'floor' classification.

Advantageously, use of the user inputs 330 and 332 with a trained semantic segmentation unit 404 as a final step in a training process may enable a robot 102 to identify no-go zones 316 unique to an environment while still utilizing a same training image set 402 as other robots 102, even if the other robots 102 operate in different environments with different rules for operation (i.e., which floors to navigate on or avoid). For example, a robot 102 may identify a wood floor in a first environment and a user may determine the wood floor to be unnavigable by the robot 102. A second robot 102 may identify a substantially similar wood floor (i.e., substantially similar color or surface pattern) in a separate environment, wherein another user may determine the wood floor to be navigable by the robot 102. Both the first and second robots 102 may be trained using a same set of training images 402, wherein the user inputs 330 and 332 may provide further classification unique to an environment for additional training of the semantic segmentation unit 404 to identify navigable floor and unnavigable floor unique to the environment. Stated differently, user inputs 330, 332 may be unique to an environment, thereby enabling the semantic segmentation unit 404 (i.e., a neural network 500) to learn navigable and unnavigable floors based on the user inputs 330, 332 and a set of labeled training images 402, wherein the labeled training images 402 may be utilized by other robots 102 operating in different environments thereby reducing a number of labeled images required to train multiple robots 102 to identify navigable floor within separate environments.

Figure 5:
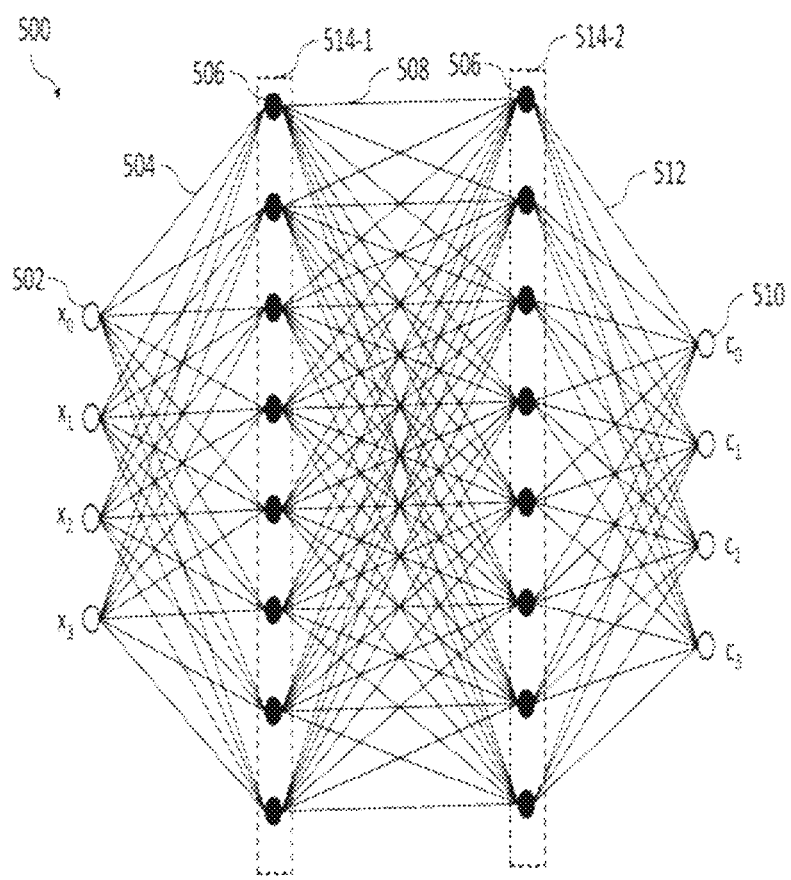
FIG. 5 illustrates a neural network in accordance with some embodiments of this disclosure.

FIG. 5 illustrates a neural network 500, according to an exemplary embodiment. The neural network 500 may comprise a plurality of input nodes 502, intermediate nodes 506, and output nodes 510. The input nodes 502 being connected via links 504 to one or more intermediate nodes 506. Some intermediate nodes 506 are respectively connected, in part, via links 508 to one or more adjacent intermediate nodes 506. Some intermediate nodes 506 are connected, in part, via links 512 to output nodes 510. Links 504, 508, 512 illustrate inputs/outputs to/from the nodes 502, 506, and 510 in accordance with equation 1 below, and may respectively be annotated as first link 504, second link 508 and third link 512. The intermediate nodes 506 may form an intermediate layer 512 of the neural network 500. In some embodiments, a neural network 500 may comprise a plurality of intermediate layers 514, intermediate nodes 506 of each intermediate layer 514 being linked to one or more intermediate nodes 506 of adjacent intermediate layers 514 (e.g., each intermediate node 506 of intermediate layers 514-1 and 514-2 are linked to each other via links 508), unless an adjacent layer is an input layer (i.e., input nodes 502) or an output layer (i.e., output nodes 510). The two intermediate layers 514-1, 514-2 illustrated may correspond to a hidden layer of neural network 500. Each node 502, 506, and 510 may be linked to any number of input, output, or intermediate nodes, wherein linking of the nodes as illustrated is not intended to be limiting.

As used herein, a feature may comprise one or more numeric values (e.g., floating point, decimal, a tensor of values, etc.) characterizing an input from a sensor unit 114 of a robot 102, described in FIG. 1A above, including, but not limited to, detection of an object, parameters of the object (e.g., size, shape, color, orientation, edges, etc.), color values of pixels of an image, depth values of pixels of a depth image, brightness of an image, the image as a whole, changes of features over time (e.g., velocity, trajectory, etc. of an object), sounds, spectral energy of a spectrum bandwidth, motor feedback (i.e., encoder values), sensor values (e.g., gyroscope, accelerometer, GPS, magnetometer, etc. readings), a binary categorical variable, an enumerated type, a character/string, or any other characteristic of a sensory input. A training feature, as used herein, may comprise any feature of which a neural network is to be trained to identify or has been trained to identify within sensor data.

The input nodes 502 may receive a numeric value xi representative of, at least in part, a feature, i being an integer index. For example, xi may represent color values of an $i^{th}$ pixel of a color image. The input nodes 502 may output the numeric value $x_i$ to one or more intermediate nodes 502 via links 504. Each intermediate node 502 of a first (leftmost) intermediate layer 514-1 may be configured to receive one or more numeric values $x_i$ from input nodes 502 via links 502 and output a value $k_{i,j}$ to links 508 following equation 1 below:

$$k_{ij} = a_{i,j}x_0 + b_{i,j}x_1 + c_{i,j}x_2 + d_{i,j}x_5 \quad \text{(Eqn. 1)}$$

Index i corresponds to a node number within a layer (e.g., x1 denotes the first input node 502 of the input layer, indexing from zero). Index j corresponds to a layer, wherein j would be equal to one (1) for the leftmost intermediate layer 514-1 of the neural network 500 illustrated and zero (0) for the input layer of input nodes 502. Numeric values a, b, c, and d represent weights to be learned in accordance with a training process described below. The number of numeric values of equation 1 may depend on a number of input links 504 to a respective intermediate node 506 of the first (leftmost) intermediate layer 514-1. In this embodiment, all intermediate nodes 506 of the first intermediate layer 514-1 are linked to all input nodes 502, however this is not intended to be limiting.

Intermediate nodes 506 of the second (rightmost) intermediate layer 514-2 may output values $k_{i,2}$ to respective links 512 following equation 1 above, wherein values $x_i$ of equation 1 for the intermediate nodes 506 of the second intermediate layer 514-2 correspond to numeric values of links 508 (i.e., outputs of intermediate nodes 506 of layer 514-1). The numeric values of links 508 correspond to $k_{i,1}$ values of intermediate nodes 506 of the first intermediate layer 514-1 following equation 1 above. It will be appreciated by one skilled in the art that constants a, b, c, d may be of different values for each intermediate node 506 of the neural network 500. One skilled in the art may appreciate that a neural network 500 may comprise of additional/fewer intermediate layers 514; nodes 502, 506, 510; and/or links 504, 508, 512 without limitation.

Output nodes 510 may be configured to receive at least one numeric value $k_{i,j}$ from at least an $i^{th}$ intermediate node 506 of a final intermediate layer 514. As illustrated, for example without limitation, each output node 510 receives numeric values $k_{0-7,2}$ from the eight intermediate nodes 506 of the second intermediate layer 514-2. The output $c_i$ of the output nodes 510 may be calculated following a substantially similar equation as equation 1 above (i.e., based on learned weights and inputs from connections 512). Following the above example where inputs xi comprise pixel color values of a color image, the output nodes 510 may output a classification $c_i$ of each input pixel (e.g., pixel i is a car, train, dog, person, background, soap, or any other classification of features). Outputs ci of the neural network 500 may comprise any numeric values such as, for example, a softmax output of probabilities or values, a predetermined classification scheme (e.g., $c_i=1$ corresponds to car, $c_i=2$ corresponds to tree, and so forth), a histogram of values, a predicted value of a parameter, and/or any other numeric value(s).

The training process comprises providing the neural network 500 with both input and output pairs of values to the input nodes 502 and output nodes 510, respectively, such that weights of the intermediate nodes 506 for both intermediate layers 514-1, 514-2, and/or additional layers 514 not illustrated, may be determined. The determined weights configure the neural network 500 to receive the input at the input nodes 502 and determine a correct output at the output nodes 510. By way of an illustrative example, labeled images may be utilized to train a neural network 500 to identify objects within the image based on annotations of the labeled images. The labeled images (i.e., the pixel RGB color values of the image) may be provided to input nodes 502 and the annotations of the labeled image (i.e., classifications for each pixel) may be provided to the output nodes 510, wherein weights of the intermediate nodes 506 may be adjusted such that the neural network 500 generates the annotations of the labeled images at the output nodes 510 based on the provided pixel color values to the input nodes 502. This process may be repeated using a substantial number of labeled images (e.g., hundreds or more) such that ideal weights of each intermediate node 506 may be determined. The neural network 500 may be considered to be trained when the neural network 500 predicts labels to an image with an accuracy (i.e., percentage of correctly labeled pixels) above a threshold value (e.g., 95%). Similarly, in some embodiments, the neural network 500 may be considered trained when a model (i.e., mathematical representation of weights of the nodes 506 which configure inputs to outputs based on the training) converges to a desired result.

Neural network 500 may be configured to receive any set of numeric values (e.g., sensor data representing a feature) and provide an output set of numeric values (e.g., detection, identification, and/or localization of the feature within the sensor data) in accordance with a training process. For example, the inputs may comprise color values of a color image and outputs may comprise classifications for each pixel of the image. As another example, inputs may comprise numeric values for a time dependent trend of a parameter (e.g., temperature fluctuations within a building measured by a sensor) and output nodes 510 may provide a predicted value for the parameter at a future time based on the observed trends, wherein measurements of the trends of the parameter measured in the past may be utilized to train the neural network 500 to predict the trends in the future. Training of the neural network 500 may comprise providing the neural network 500 with a sufficiently large number of training input/output pairs, or training data, comprising ground truth (i.e., highly accurate) training data such that optimal weights of intermediate nodes 506 may be learned.

According to at least one non-limiting exemplary embodiment, one or more outputs $k_{i,j}$ from intermediate nodes 506 of a $j^{th}$ intermediate layer 512 may be utilized as inputs to one or more intermediate nodes 506 an $m^{th}$ intermediate layer 512, wherein index m may be greater than or less than j (e.g., a recurrent or feed forward neural network). According to at least one non-limiting exemplary embodiment, a neural network 500 may comprise N dimensions for an N dimensional feature (e.g., a 5 dimensional input image), wherein only one dimension has been illustrated for clarity. One skilled in the art may appreciate a plurality of other embodiments of a neural network 500, wherein the neural network 500 illustrated represents a simplified embodiment of a neural network and variants thereof and is not intended to be limiting.

One skilled in the art may appreciate that the neural network 500 illustrated represents a simplified embodiment of a neural network illustrating, at a high level, features and functionality thereof. Other embodiments of neural networks are considered without limitation, such as recurrent neural networks (RNN), long/short term memory (LSTM), deep convolutional networks (DCN), deconvolutional networks, image cascade networks (IC Net), and the like. Further, equation 1 is intended to represent broadly a method for each intermediate node 506 to determine its respective output, wherein equation 1 is not intended to be limiting as a plurality of contemporary neural network configurations utilize a plurality of similar methods of computing outputs, as appreciated by one skilled in the art. A neural network 500 may be realized in hardware (e.g., neuromorphic processors), software (e.g., computer code on a GPU/CPU), or a combination thereof. One skilled in the art would appreciate that controller 118 of a robot 102, discussed above in FIG. 1A, may be configured to execute computer readable instructions to train and execute the neural network 500 of FIG. 5.

Figure 6:
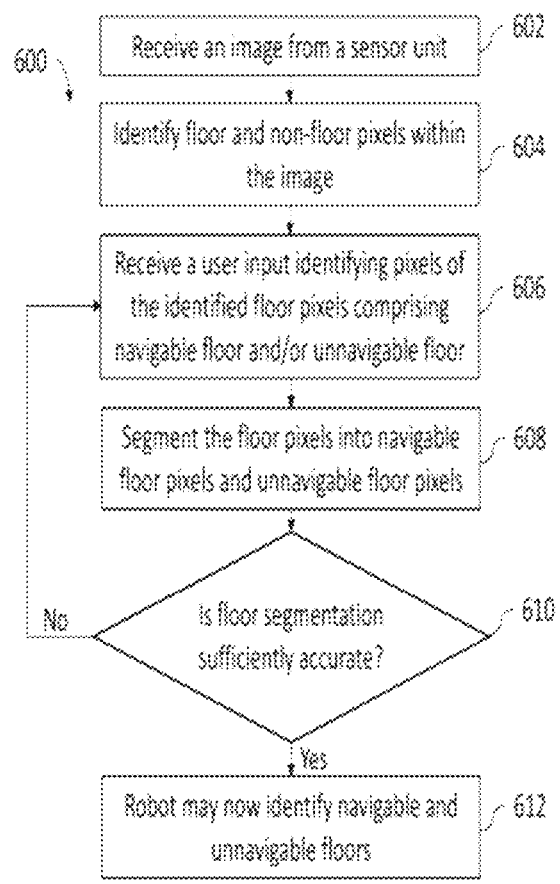
FIG. 6 is a process flow diagram illustrating a method for an image processing system of a robot to identify navigable and unnavigable floor within color images, according to an exemplary embodiment.

FIG. 6 is a process flow diagram illustrating a method 600 for a controller 118 of a robot 102 to identify navigable and unnavigable floor pixels within an image captured by a sensor unit 114, according to an exemplary embodiment. It is appreciated that any steps performed in method 600 by controller 118 comprises controller 118 executing computer readable instructions from a memory 120 illustrated in FIG. 1A above. Controller 118 may comprise any of the functionality of a semantic segmentation unit 404 described above, wherein semantic segmentation unit 404 as described above may be illustrative of computer readable instructions executed by controller 118. That is, controller 118 may execute computer readable instructions which implement, train, and execute a neural network 500, described in FIG. 5 above. In some embodiments, a neural network 500 may be implemented, trained, and executed using computer readable instructions executed by a specialized processor 130 of the robot 102 (e.g., a specialized GPU) without limitation, as appreciated by one skilled in the art.

Block 602 illustrates the controller 118 receiving an image from a sensor unit 114. The image comprising, at least in part, pixels of a floor. The pixels of the image may be encoded with color values using any conventional method of encoding the color values such as, without limitation, RGB values, HSV, greyscale, brightness and contrast, luminance, a combination thereof, and so forth.

Block 604 illustrates the controller 118 identifying floor and non-floor pixels within the image. The identification of the floor and non-floor pixels may be performed using a neural network 500, illustrated in FIG. 5, (e.g., a semantic segmentation unit 404 of system 400 illustrated in FIG. 4 above) trained to identify floor and non-floor pixels within images in accordance with a training process described above in FIGS. 2, 4, and 5 above.

Block 606 illustrates the controller 118 receiving a user input 330, 332 and identifying navigable floor pixels and/or unnavigable floor pixels, respectively, of the floor pixels identified in block 604. Controller 118 may output the received image to a user interface unit 112 such as, for example, a touch screen monitor, wherein inputs 330, 332 may be received from a user of the robot 102 to indicate 'navigable floor' pixels and 'unnavigable floor' pixels, respectively.

It is appreciated that, in some instances, the image may not represent both navigable and unnavigable floors. Accordingly, if the image does not comprise unnavigable floors, only user inputs 330, indicating navigable floors, are required to train the controller 118 to identify the navigable floors, and vice versa.

Block 608 illustrates controller 118 segmenting the floor pixels into navigable floor pixels and unnavigable floor pixels based on the user input 330, 332. Controller 118 may sample pixel color values of the identified navigable and unnavigable floor pixels, identified based on the user input 330, 332, and determine other similar pixels to be classified as navigable or unnavigable floor types based on, for example, a cluster analysis. The cluster analysis may cluster or group pixels of similar color values together, wherein the pixels similar to the pixels indicated by user inputs 330, 332 may be identified based on the clustering or grouping. Pixels identified to correspond to the 'navigable floor' pixels may be associated with the 'floor' classification and pixels identified to correspond to 'unnavigable floor' pixels may be associated with the 'no-go zone' classification as a means for reducing a number of classifications of which the controller 118 is to be configured to learn to two classes. Advantageously, training the neural network 500 to classify pixels into two classes requires substantially fewer training inputs (e.g., labeled training images; user inputs 330, 332 of samples of navigable and unnavigable floor pixels, etc.) as opposed to training the neural network 500 to classify three or more classifications. Additionally, training the neural network 500 to identify two classes uses substantially fewer computing resources (e.g., fewer intermediate nodes 506 used) than training of the neural network 500 to identify three or more classes.

Block 610 illustrates a decision performed by a user of the robot 102 based on segmentation of navigable floor pixels and unnavigable floor pixels performed in block 608 above. The controller 118 may display a segmentation of the image to the user interface unit 112, the display comprising segmented regions of 'floor' (i.e., pixels determined to be floor which correspond to navigable floor based on user inputs 330) and 'no-go zone' (i.e., unnavigable floor and other non-floor regions based on user inputs 332 and prior training using training set of labeled images 402). The user interface unit 112 may display the image itself; the predicted segmentation based on the user input 330, 332 of block 608 above (e.g., similar to predicted segmentation 324 of FIG. 3B); or the predicted segmentation overlaid (e.g., a transparent overlay) over the image. That is, controller 118 may display to the user a predicted segmentation of 'floor' pixels and 'no-go zone' pixels, based on the user inputs 330, 332, wherein the user may determine if the predicted segmentation is sufficiently accurate. The iterative process of blocks 606-610 is further illustrated using an exemplary embodiment of FIG. 7 below.

Upon the user determining the predicted segmentation is sufficiently accurate, the user may provide an input (e.g., pressing a 'DONE' button 716 illustrated in FIG. 7) to the user interface unit 112 prompting the controller 118 to move to block 612. Block 612 illustrates completion of the training for identification of the navigable floor, classified as 'floor', and unnavigable floor, classified as 'no-go zone' along with non-floor pixels, within the image.

Upon the user determining the predicted segmentation is not sufficiently accurate, the user may provide additional inputs 330, 332, thereby moving controller 118 back to block 606. The additional user inputs 330, 332 may provide additional samples of 'navigable floor' pixels and/or 'unnavigable floor' pixels for further training of the controller 118 (i.e., neural network 500) to better identify the navigable and unnavigable floor pixels within the image.

It is appreciated that the image received in block 602 may not capture all floor types within an environment. Accordingly, the user may move the robot 102 to various positions within the environment such that images of all floor types may be captured, wherein user inputs 330, 332 may be provided to teach to the controller 118 which floors are navigable and unnavigable. That is, method 600 may be repeated to train the controller 118 to classify all floor types within an environment as 'floor' (i.e., navigable floor space) or 'no-go zone' (i.e., unnavigable floor space and non-floor regions) if all floor types cannot be depicted in a single image.

Figure 7:
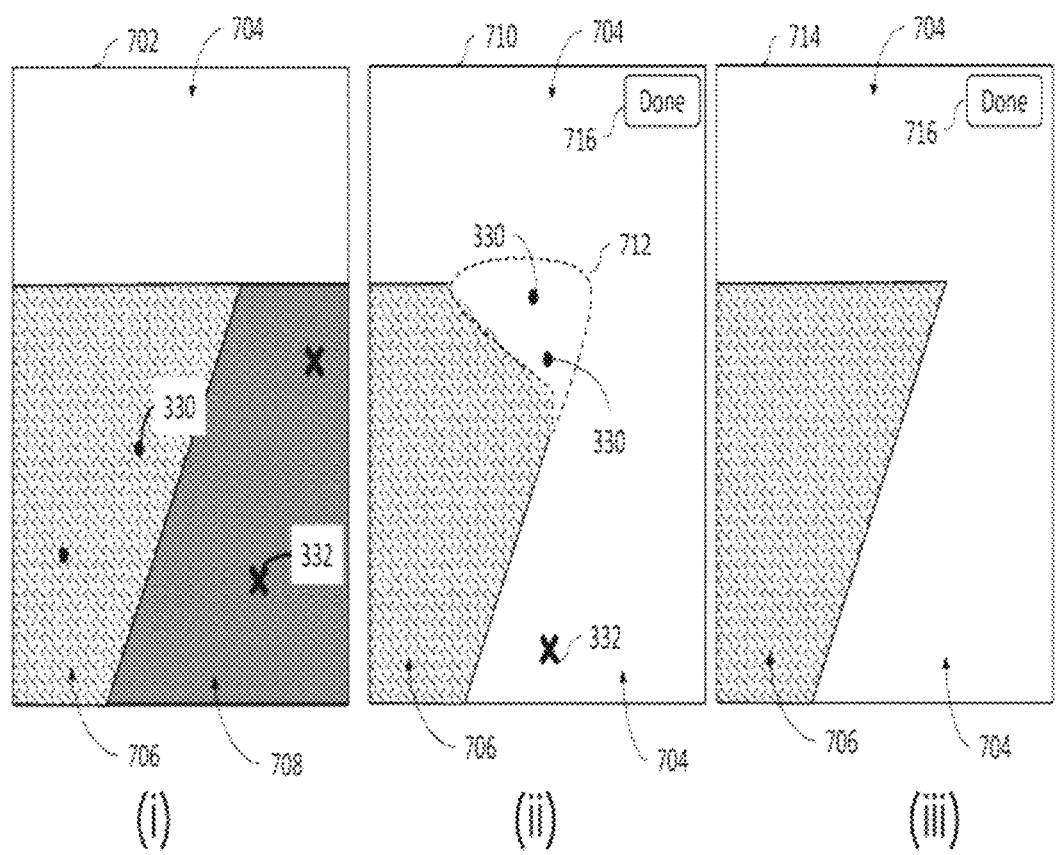
FIG. 7 (i)-(iii) illustrates a user providing a first user input to configure a neural network to segment an image into navigable and unnavigable floor pixels and providing a second user input to further train a neural network to improve the segmentation, according to an exemplary embodiment.

FIG. 7 (*i*)-(*iii*) further illustrates methods performed in blocks 606-610 of method 600 illustrated in FIG. 6 above, according to an exemplary embodiment. Image 702, depicted in FIG. 7(*i*), corresponds to an image received in block 602 of method 600 above. The image 702 may comprise two floor types 706, 708, wherein the two floor types 706, 708 have been identified as 'floor' based on training using a training of a neural network 500 using a set of labeled images 402 (e.g., by a manufacturer of the robot 102) comprising images labeled with 'floor' and 'non-floor' (i.e., no-go zone 704) classifications, as discussed above. It is appreciated that without user inputs 330, 332, the neural network 500 may not identify the two floor types 706, 708 separately as illustrated, wherein the neural network 500 may classify both the floors 706, 708 as 'floor'. That is, without the user inputs 330, 332, the neural network 500 may output a predicted segmentation similar to predicted segmentation 318 of FIG. 3B, wherein the two floor types 706, 708 have been illustrated using different textures for clarity (i.e., as a reference distinguishing, for example, carpet versus wooden floor). The image 702 may be displayed onto a user interface unit 112 such that user inputs 330, 332 may be provided, the user input 330 (circles) indicates pixels of navigable floor and user input 332 (crosses) indicates pixels of unnavigable floor. Using these inputs 330, 332, the neural network 500 may segment the image 702 into two regions: navigable floor 706 and no-go zone 704, wherein the user indicated pixels 332 corresponding to unnavigable floors 708 are classified as 'no-go zones' 704 and the indicated pixels 330 corresponding to navigable floors 706 are classified as 'floor' to reduce a number of classes the neural network 500 is to be trained to identify to two classes.

Accordingly, the controller 118 may execute computer readable instructions to output a first predicted segmentation 710 to the user interface unit 112. The first predicted segmentation 710, illustrated in FIG. 7(ii), being illustrative of a display to the user indicating identified navigable and unnavigable floor pixels based on the user inputs 330, 332. As illustrated in the first predicted segmentation 710, upon user inputs 330, 332, the unnavigable floor 708 segment or region is then classified as a no-go zone 704 (illustrated in white), and thereby dissolving or disappearing as a separate and distinct region on the first predicted segmentation 710. Stated differently, region 708 of the image 702 is associated with the as no-go zone 704 classification based on user inputs 332.

Further, as illustrated in FIG. 7(ii) in the first predicted segmentation 710, a portion 712 of region 706, with reference to image 702 of FIG. 7(i), may be incorrectly determined by the neural network 500 to comprise a 'no go zone' 704 (e.g., due to different lighting or perspective view of region 712 of floor 706 compared to the other portions of floor 706). The user may provide additional user inputs 330 as illustrated indicating one or more pixels corresponding to the navigable floor 706 within the region 712. The user, in some instances, may further provide additional user inputs 332 to provide the neural network 500 with additional samples of color values of unnavigable floor 708. Using the additional color values of pixels indicated by the user input 330, the neural network 500 may perform methods illustrated in block 606-608 of method 600 above to generate a second predicted segmentation 714, as illustrated in FIG. 7(iii). The second predicted segmentation 714 comprises a more accurate representation of floor 706 (with reference to image 702), now classified as 'floor', and a more accurate representation of floor 708 and no go zone 704, now classified together as 'no-go zone' 704. The user may determine the predicted segmentation 714 accurately determines navigable floor 706 and classifies unnavigable floor as 'no-go zone' 704 and may subsequently press the 'DONE' button 716 to indicate to the controller 118 that the segmentation of the floor is accurate and user supervised training is complete (i.e., the determination of block 608 of method 600 above).

Advantageously, the user supervised training (i.e., providing of inputs 330, 332) as a final step of training a neural network 500 of a robot 102 may further configures the neural network 500 to classify pixels of 'floor' and 'no-go zone' in a specific way such that the pixels classified as 'floor' correspond to navigable floor, wherein the choice of navigable floor is dictated by the user inputs 330, 332. User inputs 330, 332 are analogous to annotating or labeling of the image 702 which may be utilized as training input to the neural network 500 similar to the use of a training set of labeled images to train the neural network 500 to identify floor from non-floor pixels (e.g., blocks 202-204 of method 200 above). The annotations or labels provided by the user inputs 330, 332 being chosen based on a decision of the user of the robot 102, thereby enhancing control of the user to determine motion, task performance, and behavior of the robot 102 during autonomous operation to best suit the respective environment of the robot 102 and user.

Figure 8:
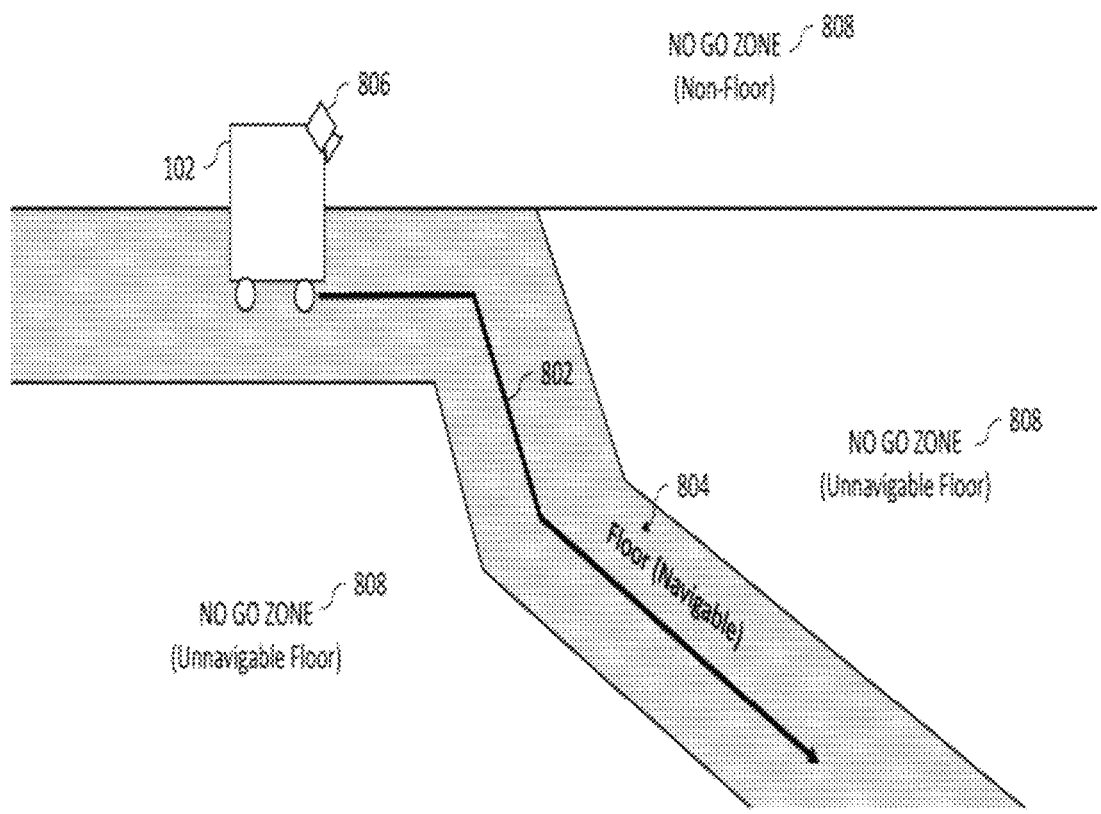
FIG. 8 illustrates a robot utilizing the systems and methods of this disclosure to plan a route along navigable floor while avoiding unnavigable floor, according to an exemplary embodiment.

FIG. 8 illustrates a robot 102 navigating a route 802 along floor 804 (shaded in grey), the floor 804 being determined to comprise a navigable portion of a floor surrounding the robot 102, according to an exemplary embodiment. A neural network 500 of the robot 102 may be trained to identify floor and non-floor pixels within images using a training set of labeled images 402, illustrated in FIG. 4 above, using methods illustrated in blocks 202-204 of FIG. 2 above. The non-floor pixels being associated with a 'no-go zone' classification 808 and the floor pixels being associated with a 'floor' classification. The neural network 500 may be further trained by a user within the environment illustrated to associate navigable floors as the 'floor' class and unnavigable floors as the 'no-go zone' class using method 600 of FIG. 6 above, wherein the navigable floors are indicated by user inputs 330 and unnavigable floors are indicated by user inputs 332 as described in FIGS. 3B, 6, and 7 above. The robot 102 may comprise a camera 806 configured to capture images comprising, at least in part, pixels representing the floor surrounding the robot 102.

The neural network 500 may utilize data from the camera 806 (i.e., images) to determine which portions of the floor is navigable and which portions of the floor is unnavigable in accordance with the training process described in FIGS. 2 and 6 above. The robot 102 may accordingly plan the route 802 such that the route 802 navigates the robot 102 along only floor 804, determined to comprise navigable floor based on user inputs 330, and to avoid no-go zones 808. The regions classified as no-go zones 808 may comprise either regions in space corresponding to non-floor (e.g., objects, regions above the floor, etc.) or regions comprising unnavigable floor (e.g., as indicated by user inputs 332).

It is appreciated that the robot 102 of FIG. 8 may utilize any conventional method for localizing the floor 804 without limitation, such as, for example, using two or more sensors 806 and measuring a binocular disparity between images captured contemporaneously by the two sensors 806. As another example, localization of the floor 804 may be performed by the controller 118 tracking relative motion of the floor pixels within images captured by the sensor 806 and localizing the floor pixels based on the relative motion and motions of the robot 102. Localization of the pixels of an image to space around the robot 102 (e.g., localizing navigable floor pixels to locations on a computer readable map) may, in some embodiments of robot 102, be required to plan a route 802, as appreciated by one skilled in the art.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various exemplary embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

What is claimed is:

1. A robotic system, comprising:
a memory having computer readable instructions stored thereon; and
a processor configured to execute the computer readable instructions to:
receive an image from a sensor on a robot learning a route during training from a user,
perform a first semantic segmentation on the image to determine floor pixels and non-floor pixels of the image, the first semantic segmentation being performed by a neural network based on learned associations developed during a training process prior to learning the route during training from the user,
receive a first user input during training from the user comprising an indication of at least one pixel of the floor pixels corresponding to a navigable floor, and
perform a second semantic segmentation on the image to determine navigable floor pixels and unnavigable floor pixels of the determined floor pixels based on the first user input; and
determine a set of weights for the neural network during the training process, the weights being determined based on at least in part on color values of pixels and respective labels of the pixels of an initial set of labeled training images, the classifications of the pixels of the initial set comprise at least floor and non-floor classes, wherein the weights are modified based on the first user input.

2. The robotic system of claim 1, wherein the processor is further configured to execute the computer readable instructions to:
receive a second user input comprising an indication of at least one pixel of the floor pixels in the image corresponding to an unnavigable floor.

3. The robotic system of claim 2, wherein,
the unnavigable floor pixels indicated by the second user input are classified with the classification of the non-floor pixels, and
the navigable floor pixels indicated by the first user input are classified with the classification of the floor pixels.

4. The robotic system of claim 1, wherein the processor is further configured to execute the computer readable instructions to:
effectuate motion of the robotic system away from zones represented by the unnavigable floor pixels and along zones represented by the navigable floor pixels.

5. The robotic system of claim 1, wherein,
the first user input comprises indication of at least one pixel on a user interface, the user interface displaying one of the image, the first semantic segmentation of the image, or a combination thereof.

6. The robotic system of claim 5, wherein the processor is further configured to execute the computer readable instructions to:
display on the user interface the second segmentation of the image based on the first user input;
receive a third user input indicating at least one additional pixel of the image corresponding to navigable floor or at least one additional pixel of the image corresponding to unnavigable floor, and
perform a third semantic segmentation to the image based on the third user input, the third semantic segmentation is different from the first and second semantic segmentations and is performed during autonomous operation of the robotic system.

7. A non-transitory computer readable storage medium comprising a plurality of instructions embodied thereon, that when executed by a processor, configure the processor to:
- receive an image from a sensor on a robot learning a route during training from a user;
- perform a first semantic segmentation on the image to determine floor pixels and non-floor pixels of the image, the first semantic segmentation being performed by a neural network based on learned associations developed during a training process prior to learning the route during training from the user;
- receive a first user input during training from the user comprising an indication of at least one pixel of the floor pixels corresponding to a navigable floor; and
- perform a second semantic segmentation on the image to determine navigable floor pixels and unnavigable floor pixels of the determined floor pixels based on the first user input; and
- determine a set of weights for the neural network during the training process, the weights being determined based at least in part on color values of pixels and respective labels of the pixels of an initial set of labeled training images, the classifications of the pixels of the initial set comprise at least floor and non-floor classes, wherein the weights are modified based on the first user input.

8. The non-transitory computer readable storage medium of claim 7, wherein the processor is further configured to execute the plurality of instructions to:
- receive a second user input comprising an indication of at least one pixel of the floor pixels in the image corresponding to an unnavigable floor.

9. The non-transitory computer readable storage medium of claim 8, wherein,
- the unnavigable floor pixels indicated by the second user input are classified with the classification of the non-floor pixels, and
- the navigable floor pixels indicated by the first user input are classified with the classification of the floor pixels.

10. The non-transitory computer readable storage medium of claim 7, wherein the processor is further configured to execute the plurality of instructions to:
- effectuate motion of the robotic system away from zones represented by the unnavigable floor pixels and along zones represented by the navigable floor pixels.

11. The non-transitory computer readable storage medium of claim 7, wherein,
- the first user input comprises indication of at least one pixel on a user interface, the user interface displaying one of the image, the first semantic segmentation of the image, or a combination thereof.

12. The non-transitory computer readable storage medium of claim 11, wherein the processor is further configured to execute the plurality of instructions to:
- display on the user interface the second segmentation of the image based on the first user input;
- receive a third user input indicating at least one additional pixel of the image corresponding to navigable floor or at least one additional pixel of the image corresponding to unnavigable floor; and
- perform a third semantic segmentation to the image based on the third user input, the third semantic segmentation is different from the first and second semantic segmentations and is performed during autonomous operation of the robot.

13. A method for effectuating motion of a robot, the method comprising:
- receiving an image from a sensor on a robot learning a route during training from a user;
- performing a first semantic segmentation on the image to determine floor pixels and non-floor pixels of the image, the first semantic segmentation being performed by a neural network based on learned associations developed during a training process prior to learning the route during training from the user;
- receiving a first user input during training from the user comprising an indication of at least one pixel of the floor pixels corresponding to a navigable floor; and
- performing a second semantic segmentation on the image to determine navigable floor pixels and unnavigable floor pixels of the determined floor pixels based on the first user input; and
- determining a set of weights for the neural network during the training process, the weights being determined based at least in part on color values of pixels and respective labels of the pixels of an initial set of labeled training images, the classifications of the pixels of the initial set comprise at least floor and non-floor classes, wherein the weights are modified based on the first user input.

14. The method of claim 13, further comprising:
- receiving a second user input comprising an indication of at least one pixel of the floor pixels in the image corresponding to an unnavigable floor.

15. The method of claim 14, wherein,
- the unnavigable floor pixels indicated by the second user input are classified with the classification of the non-floor pixels, and
- the navigable floor pixels indicated by the first user input are classified with the classification of the floor pixels.

16. The method of claim 13, wherein,
- the first user input comprises indication of at least one pixel on a user interface, the user interface displaying one of the image, the first semantic segmentation of the image, or a combination thereof.

17. The method of claim 13, further comprising:
- Effectuating motion of the robot away from zones represented by the unnavigable floor pixels and along zones represented by the navigable floor pixels.

* * * * *